US009638711B2

(12) United States Patent
Barfield et al.

(10) Patent No.: US 9,638,711 B2
(45) Date of Patent: May 2, 2017

(54) METHOD AND SYSTEM FOR DISCERNING A FALSE POSITIVE IN A FALL DETECTION SIGNAL

(75) Inventors: James R. Barfield, Atlanta, GA (US); Thomas S. Taylor, Sandy Springs, GA (US); Deep Kalinadhabhotla, Atlanta, GA (US)

(73) Assignee: Verizon Telematics Inc., Atlanta, GA (US)

( * ) Notice: Subject to any disclaimer, the term of this patent is extended or adjusted under 35 U.S.C. 154(b) by 501 days.

(21) Appl. No.: 13/526,421

(22) Filed: Jun. 18, 2012

(65) Prior Publication Data
US 2013/0197856 A1 Aug. 1, 2013

Related U.S. Application Data

(60) Provisional application No. 61/498,374, filed on Jun. 17, 2011.

(51) Int. Cl.
*G01P 15/00* (2006.01)
*G01P 15/18* (2013.01)
*G01P 15/08* (2006.01)

(52) U.S. Cl.
CPC .......... *G01P 15/00* (2013.01); *G01P 15/0891* (2013.01); *G01P 15/18* (2013.01)

(58) Field of Classification Search
CPC ................. G01P 15/18; G01P 15/00

USPC ........................................... 702/141
See application file for complete search history.

(56) References Cited

U.S. PATENT DOCUMENTS

| | | | |
|---|---|---|---|
| 2006/0270949 A1* | 11/2006 | Mathie | A61B 5/0002 600/595 |
| 2006/0282021 A1* | 12/2006 | DeVaul et al. | 600/595 |
| 2009/0322540 A1* | 12/2009 | Richardson | A61B 5/0002 340/573.7 |
| 2011/0144542 A1* | 6/2011 | Jin et al. | 600/595 |

* cited by examiner

*Primary Examiner* — Manuel Rivera Vargas

(57) ABSTRACT

Methods reduce the likelihood of an MPERS device falsely reporting a high acceleration event as a fall impact. The device stores acceleration data acquired before the high acceleration and afterward. If a number of samples of magnitude values from accelerometer sensors in the device acquired during as interval before the high acceleration that approach 0G exceeds a predetermined number, the high acceleration is deemed from a non-fall. Acceleration sensors can also indicate an orientation change before/after the high acceleration, and a barometric pressure sensor can do the same, to further characterize an event as a non-fall. A method compares current event data to composite data sets that have been determined from a plurality of empirically derived data sets of fall and non-fall events. High correlations can indicate falls, or non-falls, respectively. Further statistical analysis of data acquired after an event reduces the likelihood of falsely indicating a fall.

20 Claims, 26 Drawing Sheets

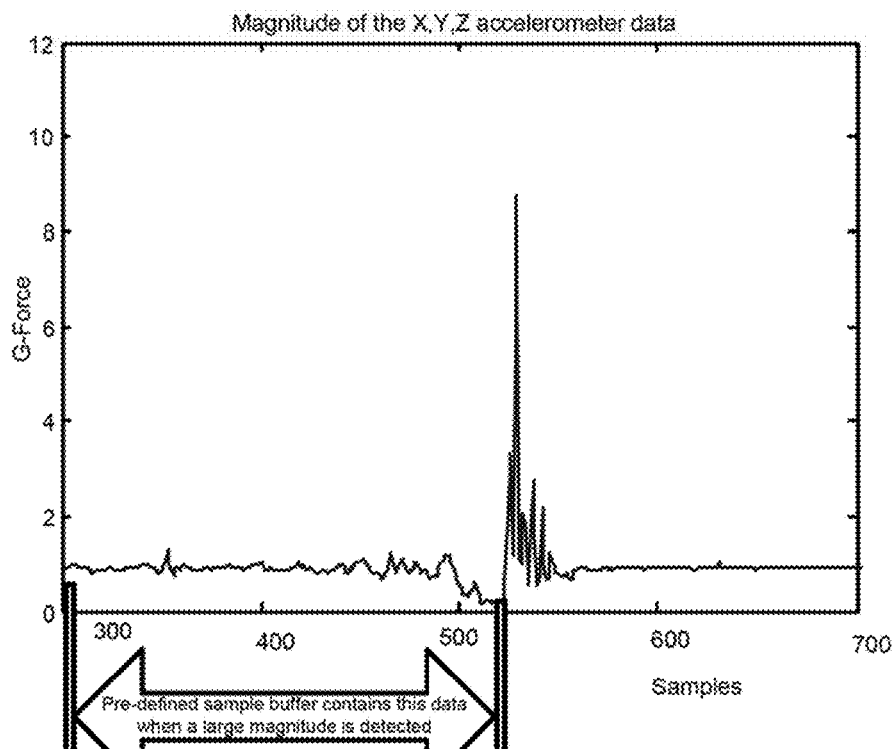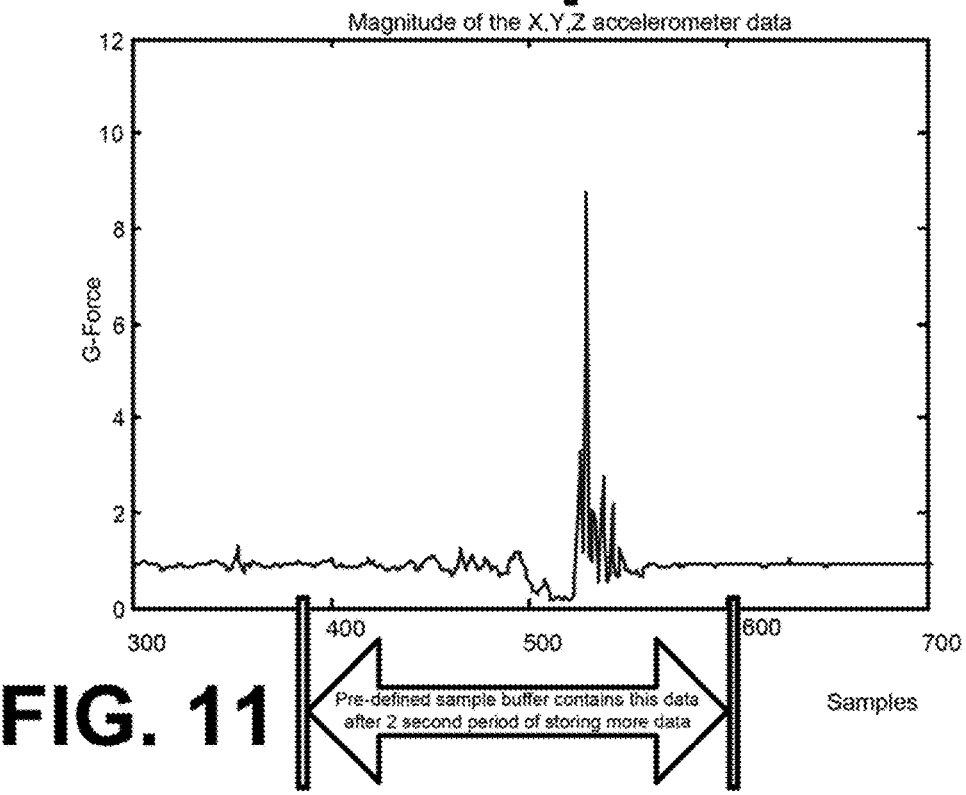
FIG. 11

$n$ : NUMBER OF COMPOSITE NON-FALL EVENT DATA SETS
(i.e., # OF GROUPS FROM FIG. 15)
$n_f$ : NUMBER OF SAMPLES IN A COMPOSITE DATA SET
$i$ : INDICES OF EACH VECTOR (i.e., COUNT OF SAMPLES IN A DATA SET)

$n$ : NUMBER OF COMPOSITE NON-FALL EVENT DATA SETS
   (i.e., # OF GROUPS FROM FIG. 18)
$n_f$: NUMBER OF SAMPLES IN A COMPOSITE DATA SET
$i$ : INDICES OF EACH VECTOR (i.e., COUNT OF SAMPLES IN A DATA SET)

$$n = Nb * samplerate\_of\_accelerometer \quad \text{(EQ. 1)}$$

$$([X_0...X_n],[Y_0...Y_n],[Z_0...Z_n]) \quad \text{(EQ. 2)}$$

$$M_0..M_n = \sqrt{[X_0..X_n]^2 + [Y_0..Y_n]^2 + [Z_0..Z_n]^2} \quad \text{(EQ. 3)}$$

$$\theta_{x[0...n]} = \sin^{-1}\left[\frac{X_0...X_n}{M_0...M_n}\right] \quad \text{(EQ. 4)}$$

$$\theta_{y[0...n]} = \sin^{-1}\left[\frac{Y_0...Y_n}{M_0...M_n}\right] \quad \text{(EQ. 5)}$$

FIG. 24

$$\theta_{z[0...n]} = \sin^{-1}\left[\frac{Z_0...Z_n}{M_0...M_n}\right] \quad \text{(EQ. 6)}$$

$$\text{(EQ. 7)} \quad \theta_{ChangeX} = \left| \frac{1}{n-(Tt+20)} \sum_{i=Tt+20}^{n} \theta_{X[0...n]} - \frac{1}{Tt-20} \sum_{i=0}^{Tt-20} \theta_{X[0...n]} \right|$$

$$\text{(EQ. 8)} \quad \theta_{ChangeY} = \left| \frac{1}{n-(Tt+20)} \sum_{i=Tt+20}^{n} \theta_{Y[0...n]} - \frac{1}{Tt-20} \sum_{i=0}^{Tt-20} \theta_{Y[0...n]} \right|$$

$$\text{(EQ. 9)} \quad \theta_{ChangeZ} = \left| \frac{1}{n-(Tt+20)} \sum_{i=Tt+20}^{n} \theta_{Z[0...n]} - \frac{1}{Tt-20} \sum_{i=0}^{Tt-20} \theta_{Z[0...n]} \right|$$

$$\theta_{Change} = \theta_{ChangeX} + \theta_{ChangeY} + \theta_{ChangeZ} \quad \text{(EQ. 10)}$$

$$\theta_{Change} > \theta_{Thresh} \quad \text{(EQ. 11)}$$

$$R_{xy} = \frac{n_f \sum_{i=1}^{n_f}(Xf_i * Yfp_i) - \sum_{i=1}^{n_f}(Xf_i)\sum_{i=1}^{n_f}(Yfp_i)}{\sqrt{n_f \sum_{i=1}^{n_f}(Xf_i^2) - \left(\sum_{i=1}^{n_f}(Xf_i)\right)^2} \sqrt{n_f \sum_{i=1}^{n_f}(Yfp_i^2) - \left(\sum_{i=1}^{n_f}(Yfp_i)\right)^2}}$$

(EQ. 12)

$$\left[R_{xy}(1)...R_{xy}(n)\right] < \left[R_{xyThresh}(1)...R_{xyThresh}(n)\right]$$

(EQ. 13)

$$\left[R_{xy}(1)...R_{xy}(n)\right] > \left[R_{xyThresh}(1)...R_{xyThresh}(n)\right]$$

METHOD AND SYSTEM FOR DISCERNING A FALSE POSITIVE IN A FALL DETECTION SIGNAL

CROSS REFERENCE TO RELATED APPLICATION

The present application claims priority under 35 U.S.C. 119(e) to U.S. Provisional Patent Application No. 61/498,374 filed on Jun. 17, 2011, entitled "A method and system for discerning a false positive in a fall detection signal," which the present application incorporates by reference in its entirety.

FIELD

The invention relates to fall detection, in particular wearable mobile devices with wireless communication capabilities for determining and reporting that a fall has occurred.

BACKGROUND

Fall detection devices detect when a person falls. FIG. 1 shows a system device worn on a person that uses an accelerometer, barometer, microprocessor, and wireless transmitter to detect falls. Such a device, typically part of a mobile personal emergency response system ("MPERS"), can be placed in particular positions on the body (such as: pendant, shirt pocket, wrist, and on the waist) to sense movement based on signals from the accelerometer and changes in relative barometric pressure signals to determine if a person has fallen. The MPERS device can transmit medical and health information of the wearer to a central host computer server that can route the information to an emergency response provider. An approach to reduce the number of false positive indications within fall detection devices that use a barometer and accelerometer is described. The accelerometer senses changes in acceleration to facilitate characterization of orientation, movement, and impact associated with a current movement event that may be a fall event. A barometer senses relative pressure of the surroundings and can indicate a device's level relative to the ground by correlating the lower pressure present at higher distances above the ground and higher pressure when closer to the ground. The microprocessor processes the barometric, and accelerometer information to make inferences on if a fall has occurred. The wireless transmitter can transmit a message to a base station connected to a wired connection, or a wireless connection, for example a long range wireless link such as cellular telephony or cellular modem, or a short range wireless link such as Wi-Fi, Bluetooth, RFID, and the like to indicate and/or transmit a message to notify and to request help when the microprocessor determines a person wearing the MPERS device has fallen. The host computer can also process the received message to determine whether help is needed by a wearer. The processing can include performing various algorithms.

Shown in FIG. 2 is the 3-axis (X,Y,Z) accelerometer data taken for a typical fall with a pendant device. Fall detection devices can detect if a fall has occurred by sensing a large change in acceleration. But, determining the differences between falls and other events such as drops or sits, which an MPERS device may erroneously interpret as a fall event (i.e., the non-fall events interpreted as fall events are "false positives") can present difficulty to an MPERS device. A detailed and scientific way of understanding the differences between a fall event and a false positive can facilitate improved determination of, and distinguishing between, an actual fall event and a non-fall event, or a false positive.

When a fall occurs, the barometric pressure increases from when the person was standing to when the person is on the ground. FIG. 3 shows the increase in barometric pressure for a typical fall indicating that the device is more than 3.5 feet above the ground and then is on the ground after a fall event, based on the pressure before and after the fall event.

SUMMARY

An aspect distinguishes between drops of a fall detection device from a large height and an actual fall of a person wearing a fall detection device is sensed by performing a method of counting samples of a magnitude signal from the accelerometer sensor by sensing the amount of time the signal falls below a free-fall threshold to determine an amount of time the devices is in free-fall. If the number of samples exceeds a predetermined amount below the free-fall acceleration magnitude threshold, the fall detection device, or a remote host monitoring messages from it, concludes that a drop has occurred. The fall detection device or server, determines that an actual fall has occurred if a smaller amount of time (i.e., number of samples) below the acceleration magnitude threshold is less than the predetermined number. Various devices may implement the method such as a cell phone or other device containing accelerometer sensors and components that provide the ability to process data.

To determine the threshold value for magnitude size for the potential fall magnitude window (i.e., a predetermined number of samples below the magnitude threshold) a method sets the magnitude threshold value by using a collection of library of files containing empirical fall data for which testing personnel know that the data corresponds to an actual fall instead of a drop or other non-fall event. The method determines the largest magnitude value of the free-fall period from the library files that correspond to a fall; this is referred to as a free fall magnitude threshold.

Similarly, a method may establish the predetermined amount of time (a free fall interval threshold), or samples, that an actual fall remains in free-fall (i.e., number of samples from one or more accelerometer sensors in a fall detection device below the magnitude threshold) preceding a large acceleration event of a fall by performing a mathematical algorithm on identified portions of fall signatures from the files of the fall data library. For example, the identified portions may typically include portions of a signature, or data set, of length greater than a predetermined free fall interval that also has magnitude less than a predetermined free fall magnitude threshold value (the interval and magnitude threshold values corresponding to physical characteristics of a fall). Training is used to define the threshold value to distinguish between fall and non-fall events. As an example, a method may determine a threshold as the highest acceleration value indicated during a likely period of free-fall for all of a plurality of empirical, simulated or actual, fall data sets. Thus, assuming a large number of empirical fall data sets, an unknown (i.e., current) event data set with an acceleration signal having a magnitude value below the acceleration magnitude threshold would indicate a device containing an acceleration sensor that generated the signal was in free fall during an interval when it generated the acceleration magnitude signal value below the threshold.

In another aspect, a fall detection device, or a remote computer receiving data there from, may perform a correlation function on sampled accelerometer data that an acceleration event and data from libraries of empirical data, including data files corresponding to known fall events and files corresponding to known non-fall events (i.e., false positive events such as drops, sits, walking). In another aspect, a training method classifies different types of non-fall events to determine magnitude array signatures for use in performing correlation operations on the measured events.

Similarly, an aspect can use files from the library of the empirically acquired known fall events and a library of non-fall events to determine a correlation threshold relationships to non-fall events, activities and other types of data corresponding to data that could result in erroneously indicating a fall (i.e., a false positive).

In another aspect, a method performs magnitude signature (using an array of magnitude correlation coefficient data corresponding to fall or non-fall events) correlation of potential fall data with known fall magnitude signatures to detect falls.

In another aspect, a method performs 'training' (analysis) based on data from data sets of known fall events to determine correlation thresholds and magnitude signature characteristics to use in performing correlation functions on acquired current data and library data. The term 'training' refers to analyzing data from empirical data files corresponding to simulated fall events or known non-fall events. The analysis determines correlation coefficient thresholds by analyzing the magnitude of acceleration signals during periods of the data that correspond to a fall of a fall detection device comprising an accelerometer sensor. Thus, training characterizes fall data; more empirical data sets hone the correlation coefficient that should result from performing a correlation function with a currently acquired event data set and parameters from a training and analysis of the plurality of empirical event data sets.

FIG. 14 shows a comparison of magnitude of collected, actual event data sets to a library (i.e., a collection of data sets) of false positive events. For purposes of discussion, a data set may be referred to herein as a 'signature'—typically such terminology is used when referring to a visual representation, or plot, of data. Over time, as more event data sets are collected, the set of false positive signatures of acceleration magnitude with respect to time can lead to selection of parameters, such as a free fall threshold and a peak acceleration magnitude threshold (may be referred to as a limit) corresponding to an impact, that can more accurately distinguish a non-fall event from an event. A system can provide a means for canceling an indication of a determined fall event if the fall event is not a fall (i.e., a false positive). Such a means may include a push button, or voice command that cancels transmitting of an emergency call during a predetermined hold period following the occurrence of the event and subsequent audio, or visual, notice to a user wearing the fall detection device, that it was about to place an emergency call, or otherwise transmit information to a service provider that a fall occurred. Upon the wearer pushing the 'no-call' button, or operating other means for identifying an event as a non-fall, the event's corresponding data set may be added to a library of non-fall events either at the fall detection device, at a central server, or both. Adding the newly identified false positive/non-fall event to the local MPERS device (i.e., the device the user wears) the library becomes more custom-tailored to the user whereas transmittal to the central server of the service provider could update and refine the library, or 'knowledge base' that can be used for multiple users. In addition, the central server can maintain a separate library of fall data libraries and non-fall data libraries specific to each user. Updating a non-fall data library with a false positive event is shown by the addition to Yfp in FIG. 14—such an addition would reduce the likelihood that a similar event would cause a false positive in the future. In another aspect, a method analyzes acceleration signals from acceleration sensors of a fall detection test device spinning prior to an triggering acceleration event (e.g., high acceleration magnitude indicating an impact) to adjust the magnitude scale of acceleration data sets, or signatures, of current event data (i.e., currently occurring data signals that a real fall could be generating) to determine acceleration magnitude values and characteristics during a low-gravity, or zero-gravity, (i.e., free fall), or high-gravity event.

In another aspect, a method determines a number of zero crossings of an axis associated with an accelerometer sensor in an MPERS device that corresponds to a drop event having spinning characteristics by counting the number of zero crossings prior to a large acceleration indication (i.e., impact).

In another aspect, a method uses the zero crossings of an axis to determine limits for calculating angular acceleration values for use in scaling acceleration magnitudes of the axis. This allows for counting, during an empirical test, the number of magnitude sample values that fall below a free-fall threshold to positively identify a fall with angular velocity associated with it.

Furthermore, the pressure and the acceleration data can be analyzed after the method determines that a fall has likely occurred in order to see if movement is sensed or if the devices user has returned to an upright position. This is accomplished by processing the accelerometer signal for variance and mean changes, and the pressure signal for changes in pressure that occur as described more fully in the Detailed Description.

BRIEF DESCRIPTION OF THE DRAWINGS

FIG. 11 illustrates plots of data samples stored for a given current event using a delay timer to establish a cut-off time for halting the storing of data for the event.

FIG. 16 illustrates a flow diagram of a method for determining a correlation threshold criterion from correlating fall event data sets with each of a plurality of non-fall event composite data sets for comparing current event data to.

FIG. 19 illustrates a flow diagram of a method for determining a correlation threshold criterion from correlating fall event data sets with each of a plurality of fall event composite data sets for comparing current event data to.

FIG. 24 illustrates EQ. 1-11 referenced in FIGS. 12 and 13.

FIG. 25 illustrates EQ. 12-14 referenced in FIGS. 14-19.

DETAILED DESCRIPTION

Figure 1:
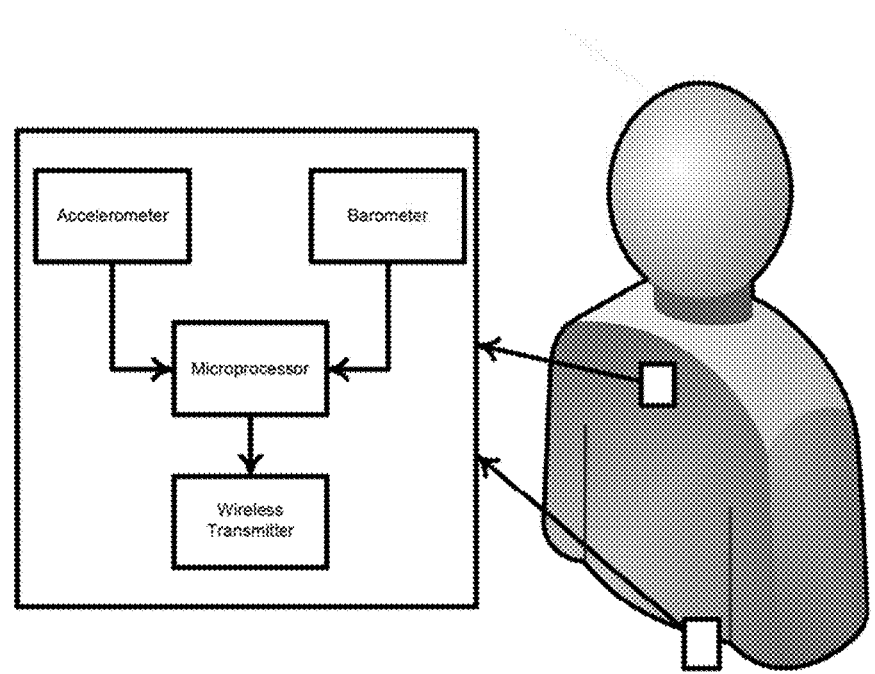
FIG. 1 illustrates location positions a person may wear an MPERS device, and the primary components a typical MPERS device comprises.

As a preliminary matter, it will be readily understood by those persons having ordinary skill in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Reduction of False Positive Indications

Definitions:

MPERS—mobile personal emergency response system.

MPERS device—a mobile device, typically including components such as memory, a processor, a wireless transmitter, a speaker and microphone, accelerometer sensors, and barometric sensor, for detecting motion of a person wearing it, or for detecting motion of an object coupled with the device. The device typically facilitates wireless, or in some case wired, transmission of data acquired by the sensors, or of results from processing data from the sensors. A given MPERS device may include more components than these given as typical, or less than these given as typical.

Fall event—unintentional actions by a person or object wearing, or otherwise coupled with, an MPERS device. The actions typically result in injury or harm to a wearer, or typically result from loss of consciousness or a sudden injury to a wearer.

Non-fall event—actions, typically intended, by a person or object wearing, object uncoupled or coupled with, an MPERS device that typically does not result in injury or harm to the wearer. Examples include: sitting, laying down, dropping an arm, engaging in athletic activities and sports, dancing, dropping the device, etc.

Event—action, or set of actions, by an individual wearing an MPERS device, or by an object coupled with and MPERS device, for which the MPERS device records the output of various sensors.

Event data set—historical data generated by MPERS sensors, or sensors in test devices, and stored for future evaluation and analysis.

Current event—event currently happening, the data set for which typically gets analyzed to determine if the current event is a fall event.

Empirical data (also empirical data set)—historical event data analytically used as a basis for determining whether a current event is a fall event.

Library—collection of data sets, typically stored in a memory as files or addressable portions of memory, wherein each data set corresponds to an historical event, including fall events and non-fall events. May also be referred to as a plurality of (empirical) data sets, or some similar reference.

False positive—indication of a fall resulting from analysis of a current event data set when the current event was actually a non-fall event.

Figure 4A:
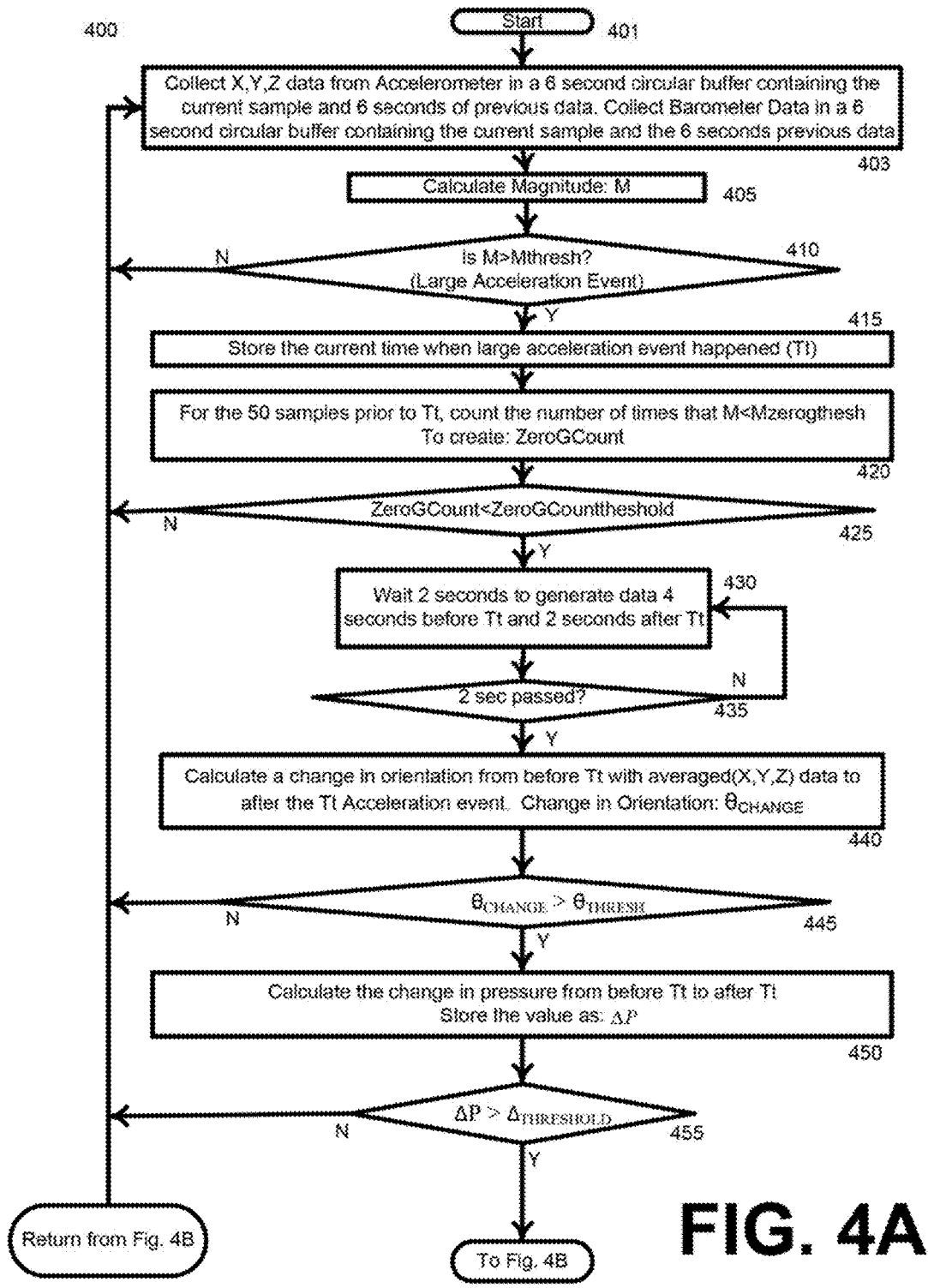
FIGS. 4A and 4B illustrate a flow diagram of a method for determining that an acceleration and pressure current event is a fall event while limiting non-fall occurrences indicating a fall.

Continuing with description of the drawings, FIG. 4A illustrates a fall detection method to reduce the number of occurrences of false positives when analyzing an event data set. When applying thresholds in the algorithm, a data set of falls in which acceleration and barometer readings empirically taken to provide a means to set threshold values. Various types of falls were performed to establish a large data set of typical falls.

Method 400 starts at step 401, and at step 403 starts analyzes data from a data event based on a large acceleration magnitude. Typically, when an acceleration magnitude value from one, or more, accelerometers in an MPERS device exceeds a predetermined trigger value (referred to herein as a trigger) the MPERS device stores data samples from the one or more accelerometers to a memory for processing and analyzing. Preferably, data is stored for accelerometer and barometer sensors. The microprocessor of the MPERS device stores incoming accelerometer data for X, Y, and Z axes from the accelerometer typically in a circular buffer (First-In First-Out) that stores the current sample and pre-defined length (preferably six seconds but could be any length) of previous data in order to have a historical representation of data if a fall occurs. This six seconds of data in the example may be referred to as an event signature window. Likewise, the microprocessor collects and stores, in a circular buffer, six seconds of data so that if a large acceleration incident occurs data will be available before and after the large acceleration occurrence. The six seconds can be changed but provides data suitable for a fall acceleration and barometer event. The six seconds, or other amount of time, of data may be referred to herein as an event window that is typically anchored around the time that the acceleration trigger occurs, and furthermore, the MPERS devices stores the four seconds before the trigger occurred and continues storing accelerometer data (and barometric data) two seconds after the trigger. Typically, the accelerometer data is sampled at 50 Hz and the barometer data is sampled between 1 to 8 Hz. It will be appreciated that the predetermined amount of time before and after the triggering acceleration Tt can be configured to be different amounts that four seconds before and two seconds after, and the total predetermined amount of time can be configured to be different than six seconds.

At step 405, for each of the current samples in the X,Y,Z direction, a acceleration magnitude value is calculated. Shown in EQ. 1 is the acceleration magnitude calculation. M is calculated according to EQ. 1 from acceleration components, along each of a plurality of perpendicular axes X, Y, and Z. Preferably, a three-axis accelerometer device included in an MPERS device generates the acceleration component signals as it experiences acceleration. The acceleration magnitude gives a value of acceleration based on the acceleration in all directions sensed preferably from a three-axis accelerometer.

$$M=\sqrt{X^2+Y^2+Z^2} \tag{EQ 1}$$

Figure 5:
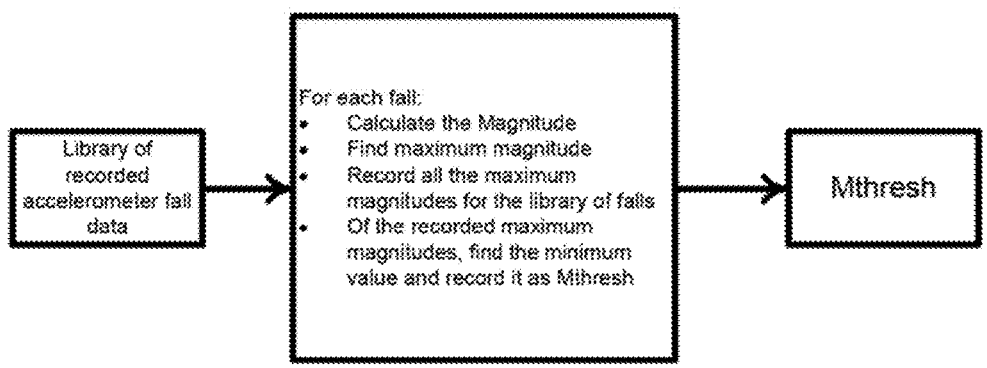
FIG. 5 illustrates a flow diagram of a method for determining an impact threshold for triggering a current event analysis.

The currently calculated acceleration magnitude value is compared to a predetermined acceleration magnitude trigger level, or threshold at step 410 to determine if the magnitude is greater than the trigger/threshold value. The threshold value is determined from evaluation of a library of fall event data sets that each include acceleration data. For each fall event data set within the library, the maximum magnitude is determined. With the resulting set of maximum values determined from all of the fall event data sets, the minimum value of all the maximum values is determined as the acceleration magnitude trigger level as shown in FIG. 5. Continuing with discussion of FIG. 4A, if the currently calculated magnitude is greater than the acceleration magnitude trigger level, the method determines that a larger acceleration event has occurred. In the physical world, a large acceleration would indicate that the device has gone through some motion such as being dropped, the person has lain down, moved quickly, jumped, stood up quickly, or fallen down.

Figure 2:
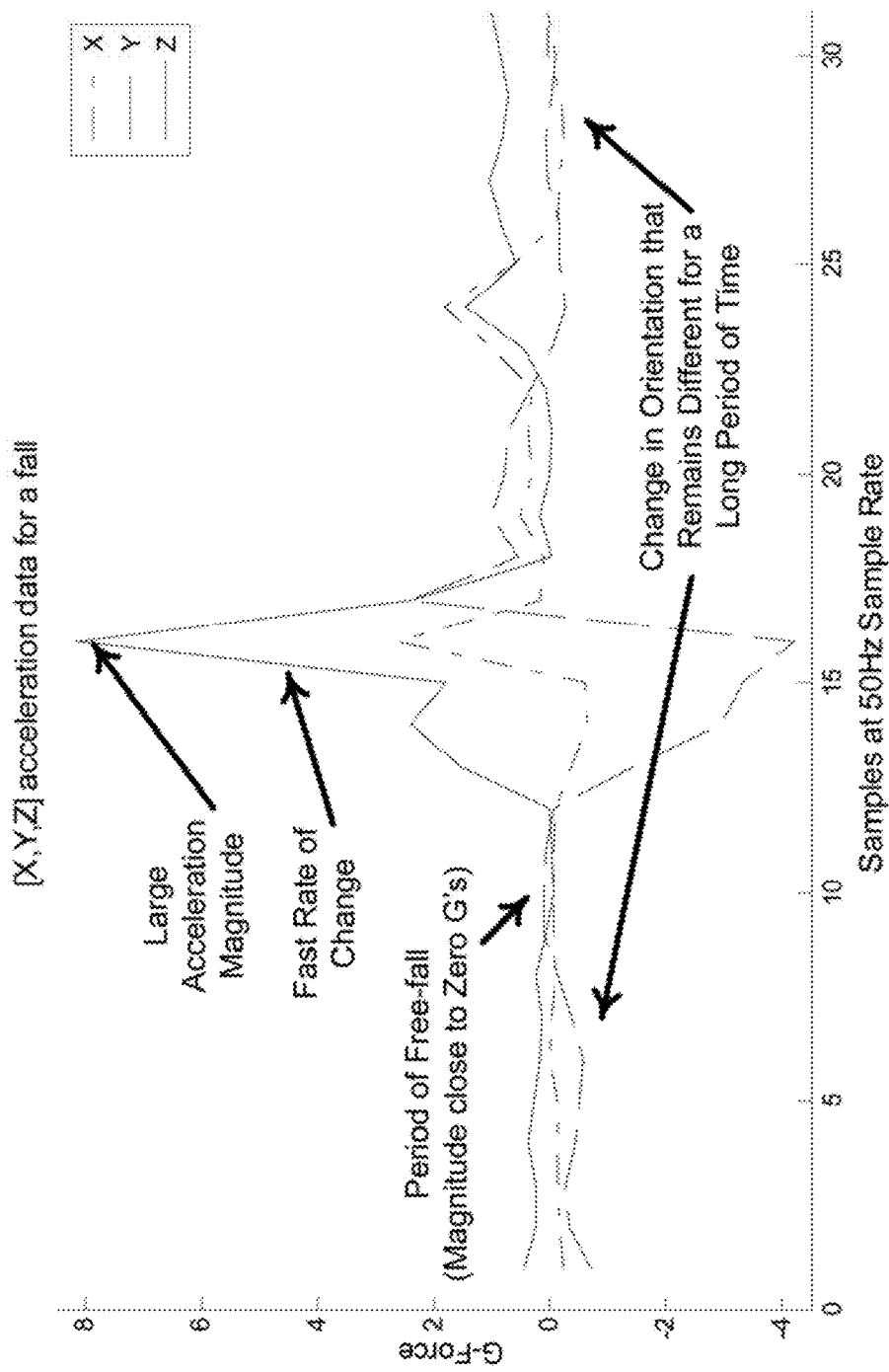
FIG. 2 illustrates plots of outputs from each of three accelerometer sensors of a three-axis accelerometer typically used in an MPERS device during a fall.
Figure 3:
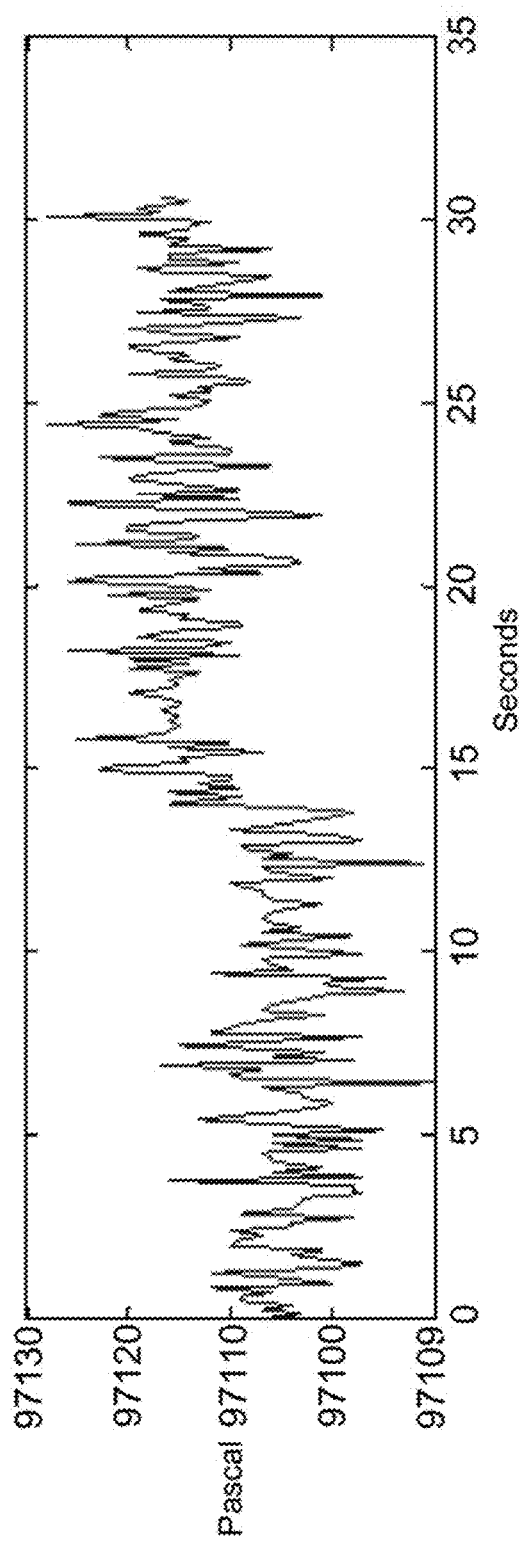
FIG. 3 illustrates a plot of barometric pressure as measured with a barometric pressure sensor typically used in an MPERS device during a fall.

When a large acceleration event occurs (i.e., a trigger occurs), the time is stored in the value Tt at step 415 to establish a point in time that a large "spike" (i.e., acceleration magnitude exceeds predetermined threshold) occurred. FIG. 2 illustrates a plot of such large acceleration spike that exceeds the predetermined threshold.

Figure 6:
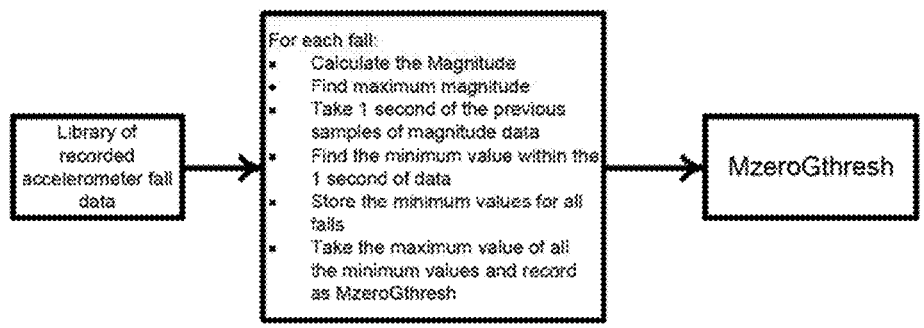
FIG. 6 illustrates a flow diagram of a method for determining a free fall threshold for analyzing a current event data set.
Figure 7:
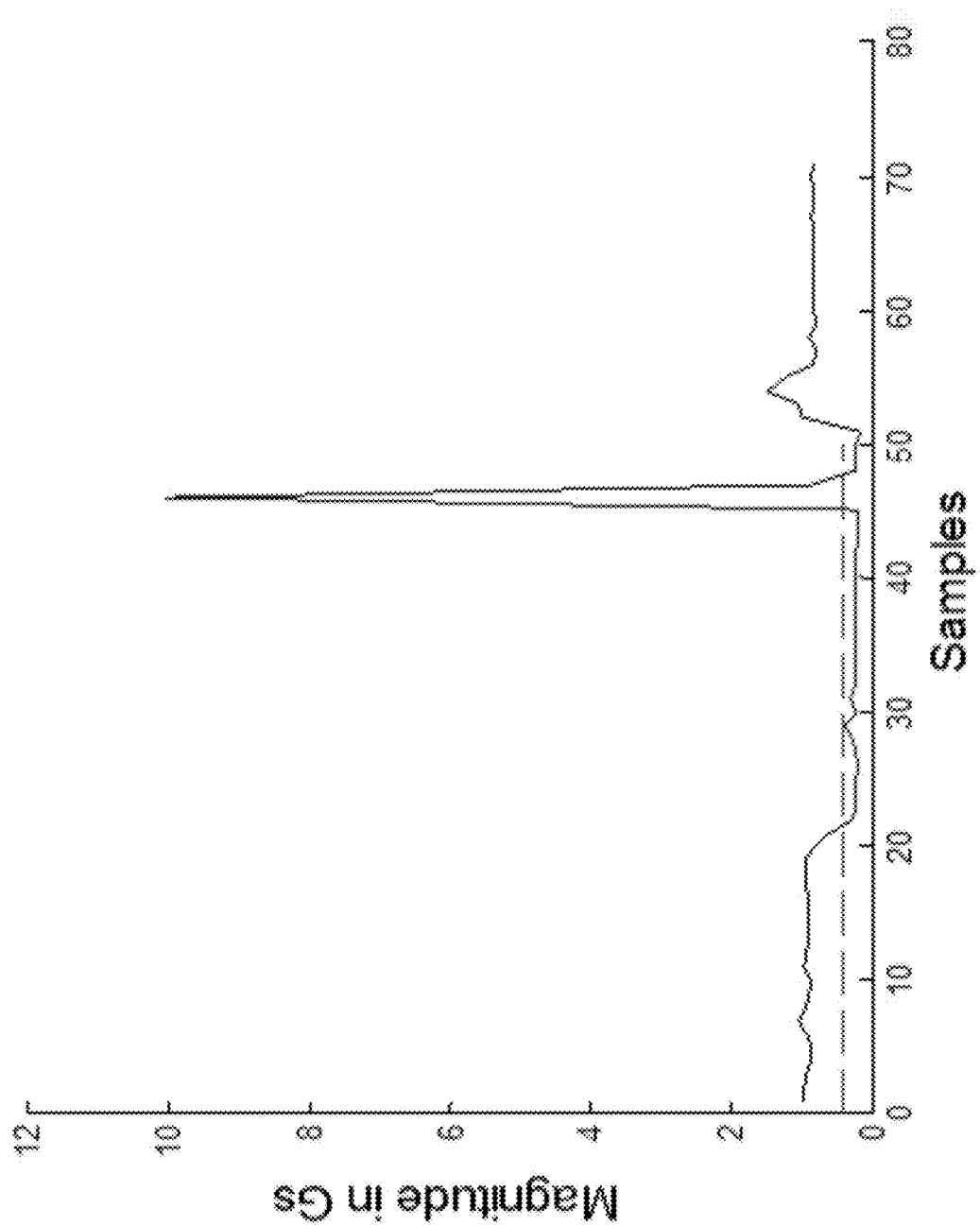
FIG. 7 illustrates a plot of acceleration magnitude of a drop (non-fall) event superimposed with a plot of a free fall threshold.

At step 420, method 400 determines whether acceleration magnitude values of a current event data set drop below a free fall magnitude threshold value, MzeroGthresh. MzeroGthresh is determined by analyzing acceleration data for each data set of a library of known fall event data sets. FIG. 6 illustrates an example of processing a plurality of known fall even data sets of a library to determine MzeroGthresh. Method 600 determines a maximum magnitude (Tt) for each fall data set in the library. Then, the minimum value of acceleration magnitude within a one second window (the window can be of any length, one second is used because typical falls rarely have a free-fall time greater than one second) before the trigger acceleration event (Tt) for each fall event data set is determined and stored. The one-second window of time before Tt may be referred to herein as a free-fall interval. The maximum value of all the minimum values is then saved as the MzeroGthresh, or the predetermined free fall threshold value. FIG. 7 shows a plot of a typical drop event (i.e., non-fall event) with a dashed line to indicate MzeroGthresh. Using MzeroGthresh improves fall detection accuracy over just checking that the magnitude is close to a value of zero because accelerometer sensors have device error associated with them and a person's body does not typically experience a perfect free-fall (i.e., acceleration magnitude value zero) when actually falling.

Figure 8:
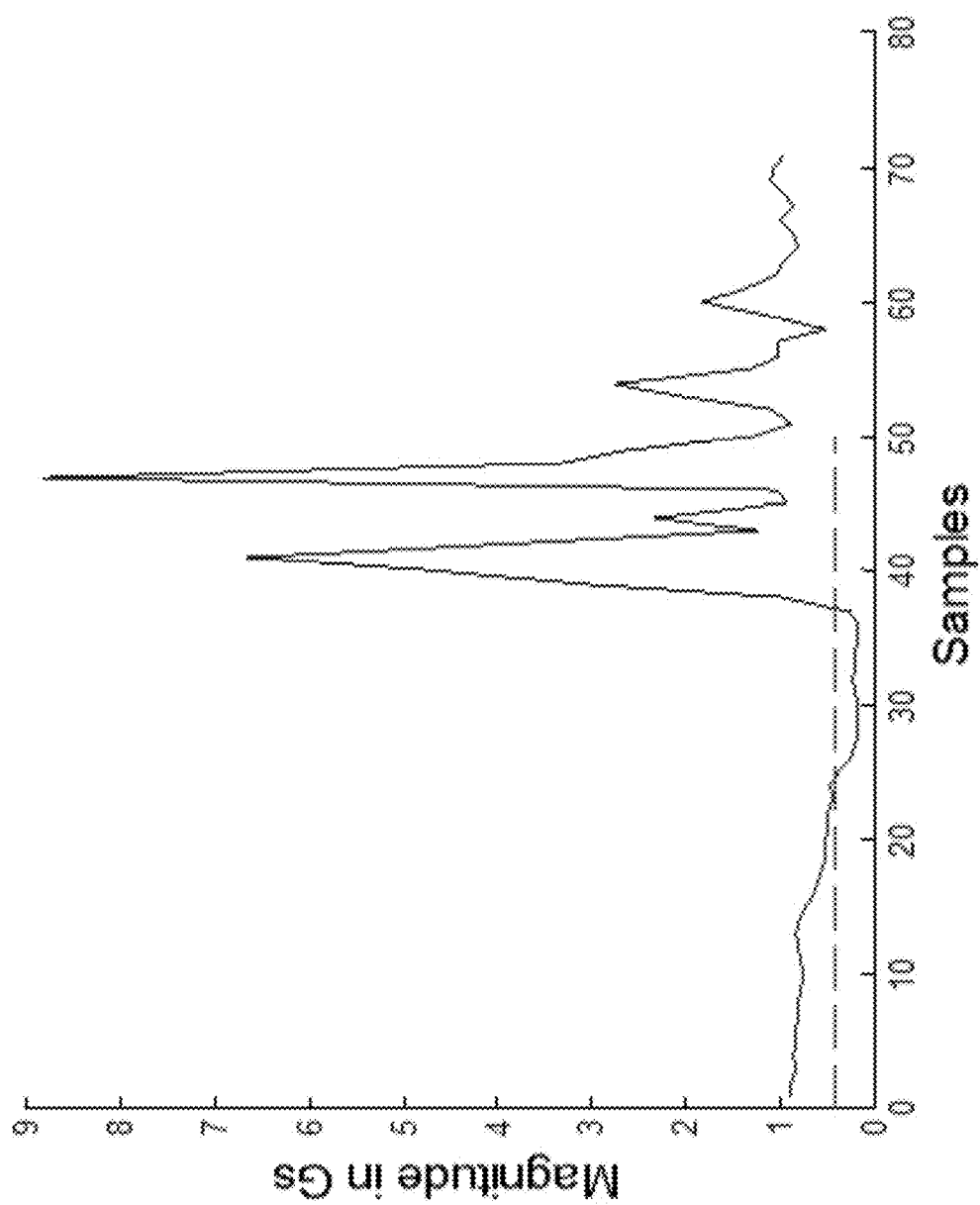
FIG. 8 illustrates a plot of acceleration magnitude of a fall event superimposed with a plot of a free fall threshold.

Experiments have shown that drops provide about the same acceleration magnitude upon impact as falls. However, drop events typically experience a greater period of time with accelerometer signals indicating less than the MzeroGthresh, corresponding to an interval of free-fall. FIG. 8 illustrates a plot of acceleration magnitude for a typical fall event. A person falling will typically experience a shorter free-fall interval then a dropped object (i.e., and unworn MPERS device). Based on this assumption, a longer time (as compared to a fall) spent in free fall can indicate a drop and thus improve the accuracy in distinguishing a drop event from a fall event. To quantitatively distinguish non-fall events from fall events, the number of samples (or amount of time) a current event data set has a measured acceleration magnitude below the MzeroGthresh is recorded for the current event data set as ZeroGCount.

At step 425, method 400 causes the processor in the MPERS device, or remote device, to compare the number of samples, ZeroGCount, having a magnitude below the free-fall threshold MzeroGthresh. If the number of counts ZeroGCount is greater than ZeroGCountthreshold, method 400 determines that the device was in free-fall for too long of a period to be a fall event and therefore the data set having ZeroGCount likely corresponds to a drop (or other non-fall) event.

Figure 9:
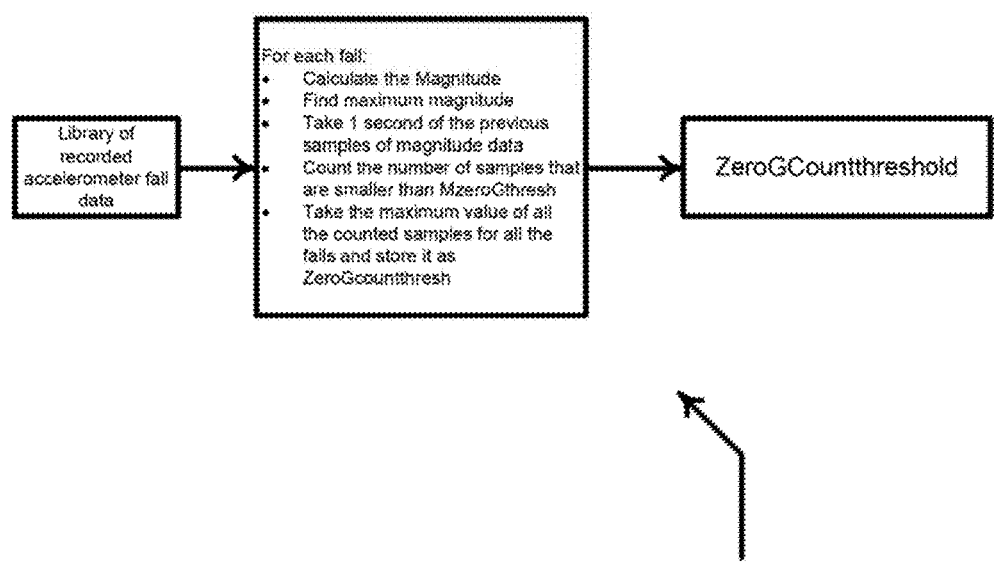
FIG. 9 illustrates a flow diagram of a method for determining a predetermined number of samples, or interval, that corresponds to free fall for use in evaluating a current event data set.
Figure 10:
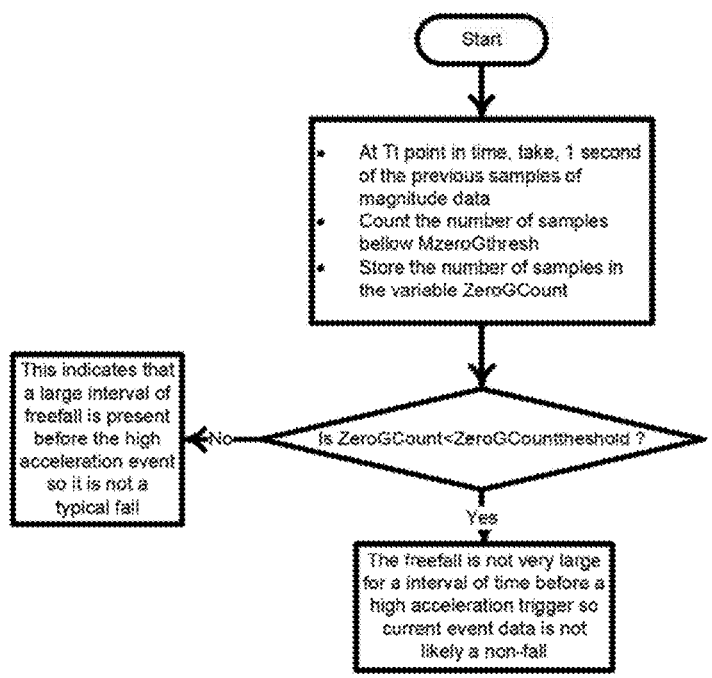
FIG. 10 illustrates a flow diagram of a method for determining that an event with a long free fall interval is a non-fall event.

To obtain a value for the free fall interval threshold ZeroGCountthreshold, method 900 shown in FIG. 9 analyzes a library of fall event data sets (these data sets are empirical and known to have been generated by fall events). Using a one-second period prior to a trigger acceleration magnitude occurrence for each fall event data set, method 900 stores the number of samples having magnitude below MzeroGthresh. Method 900 stores this number of samples having magnitude below the threshold for each of the event data sets in the fall event data set library. Method 900 uses the number of samples below the MzeroGthresh from the event data set that contains the largest number of samples having a magnitude below MzeroGthresh to establish the predetermined ZeroGCountthreshold threshold value, also referred to herein as a free fall interval threshold. FIG. 10 shows steps 420 and 425 from FIG. 4A of comparing ZeroGCount and ZeroGCountthreshold.

Figure 12:
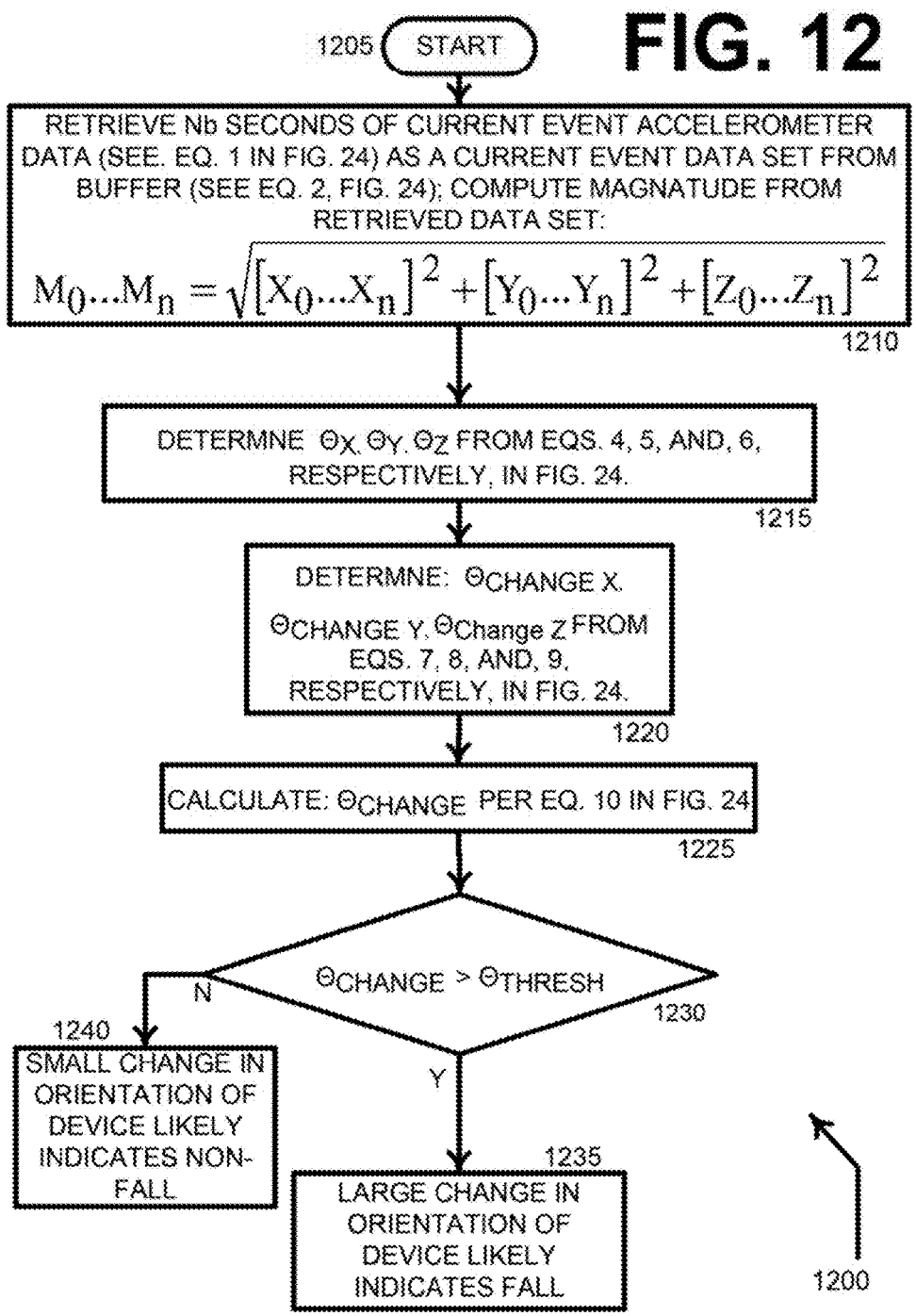
FIG. 12 illustrates a flow diagram of a method for determining an orientation of an MPERS device during a current event.

After detecting a large triggering magnitude, method 400 waits for a period after a large acceleration event has occurred to generate accelerometer and possibly barometric pressure data (steps 430 and 435). A two-second, or other desired period, timer facilitates gathering data in circular barometer and accelerometer data buffers. Using the timer provides an event data set consisting of data acquired before an acceleration trigger event and after the trigger magnitude. FIG. 11 shows a plot of data from an event. In frame 11A, the time window indicated by the large arrow includes six seconds of samples (of the event signature window) acquired before the trigger magnitude. The plot in frame 11B shows that the two-second timer has caused the oldest two seconds of samples to drop from the buffer but now the buffer includes two seconds after the trigger magnitude. It will be appreciated that the amount of time before the large magnitude and after stored by the buffer can vary from the particular values discussed in this paragraph. Selection of the buffer size may be made based on cost, design size, and performance specifications. After the wait timer expires, at step 440 the orientation of the device can indicate that the device has changed orientation—for example, the device has gone from an upright position to a position other than upright. In three dimensions, the angle from the 1G acceleration due to the force of gravity on the device is calculated and averaged from before an event occurs to after the event occurs. The mathematical sequence of events is shown in FIG. 12. The orientation of a device before an event occurs corresponds to $X_0, Y_0, Z_0$ in step 1210. Step 1215 calculates the angle in degrees from 1G associated with gravity for each of the three axes of the accelerometer. This angle calculation allows the method to calculate the change in degrees from before the fall event to after the fall event to indicate that a person has changed their orientation from a vertical to a horizontal position (the change is not always vertical to horizontal; the method is looking for a change and for certain fall types this can be very little). The absolute value of the change from before an event to after the event of the acceleration magnitude angles between the X,Y,Z axes compared to the 1G vector is deemed a change in orientation during an event as shown in steps 1220 and 1225. At step 1230 (shown as step 445 in FIG. 4A), a comparison is made of the orientation angle changes for the three acceleration angles to a predetermined orientation angle change threshold. If the actual change during the event exceeds the threshold, the event is deemed as a fall event at step 1235 and processing advances to step 450 in FIG. 4A. If the comparison as step 1230 gives a result that the orientation angle changes less than the corresponding thresholds for the three orientation angles, the event is deemed as a non-fall event at step 1240 and processing returns to step 403 as shown by the 'No' line connecting step 445 to step 403 in FIG. 4A.

Figure 13:
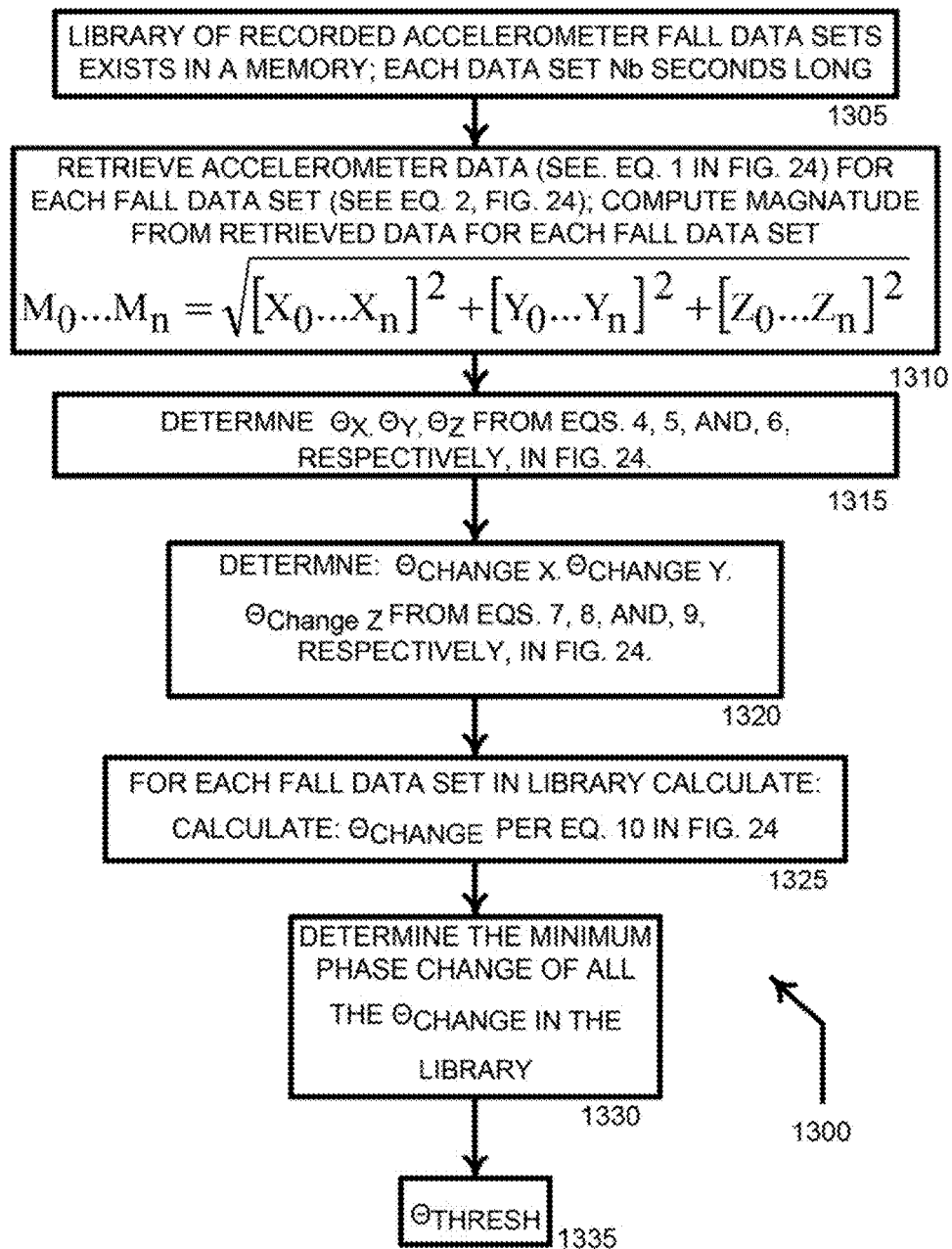
FIG. 13 illustrates a flow diagram of method for determining an orientation change threshold from a library of fall event data sets.

FIG. 13 illustrates a flow diagram of a method 1300 for calculating the threshold for orientation. Method 1300 starts at step 1305 by processing a library of acceleration data of data sets corresponding to known fall events. Steps 1310-1325 are similar to step steps 1210-1220 in FIG. 12 inasmuch as they determine a change in orientation for the data in the data sets between the beginning of a fall event and the ending of a fall event except that the steps in FIG. 13 evaluate multiple event data sets rather than just one data set as in FIG. 12. At step 1330, method 1300 stores the minimum phase change θ for each accelerometer axis determined from the multiple iteration of steps 1310-1325 (the number of iterations equals the number of fall event data sets evaluated) and stores the minimum as an orientation change threshold vector at step 1335. The result generated at step 1335 is used as discussed earlier in the determination at step 1230 in FIG. 12.

Returning to the discussion of FIG. 4A, at step 450 pressure change measured by a barometric pressure sensor reduces the likelihood of a non-fall event that generates acceleration magnitudes along the three accelerometer axes causing method 400 to otherwise indicate that a fall has occurred. For a pressure buffer n samples long, from the point Tt a large acceleration has occurred the differential pressure is calculated by taking the average pressure after a large acceleration event minus the pressure before the large acceleration event. The formula for calculating the pressure difference (ΔP) is shown in EQ. 2. The value of +/−20 samples from the acceleration event for the change in pressure could be chosen to be a different value. This +/−20 value is chosen based on a sample rate of 4 Hz but changes depending on what barometer sample rate is used.

$$\Delta P = \frac{1}{n-(Tt+20)} \sum_{i=Tt+20}^{n} P_{(0...n)} - \frac{1}{Tt-20} \sum_{i=0}^{Tt-20} P_{(0...n)} \quad (EQ\ 2)$$

At step 455 the pressure change (ΔP) is compared to a pressure change threshold ($\Delta P_{Thresh}$) to determine if the pressure change is greater than the threshold. For the pressure change threshold, a pressure change larger than an experimentally measured value ($\Delta P_{Thresh}$) that corresponds to a height (such as 3.5 ft or 15 Pascals relative pressure) predetermined to represent a short human is used. For example, a threshold of 15 Pascals might correspond to a pressure change for a human wearing an MPERS device that changes 3.5 feet during a fall event. If method 400 determines at step 455 that the measured barometric pressure change exceeds the threshold, the method advances to step 460 in FIG. 4B. If the measured pressure change does not exceed the threshold, the method advances to step 403 in FIG. 4A.

Figure 4B:
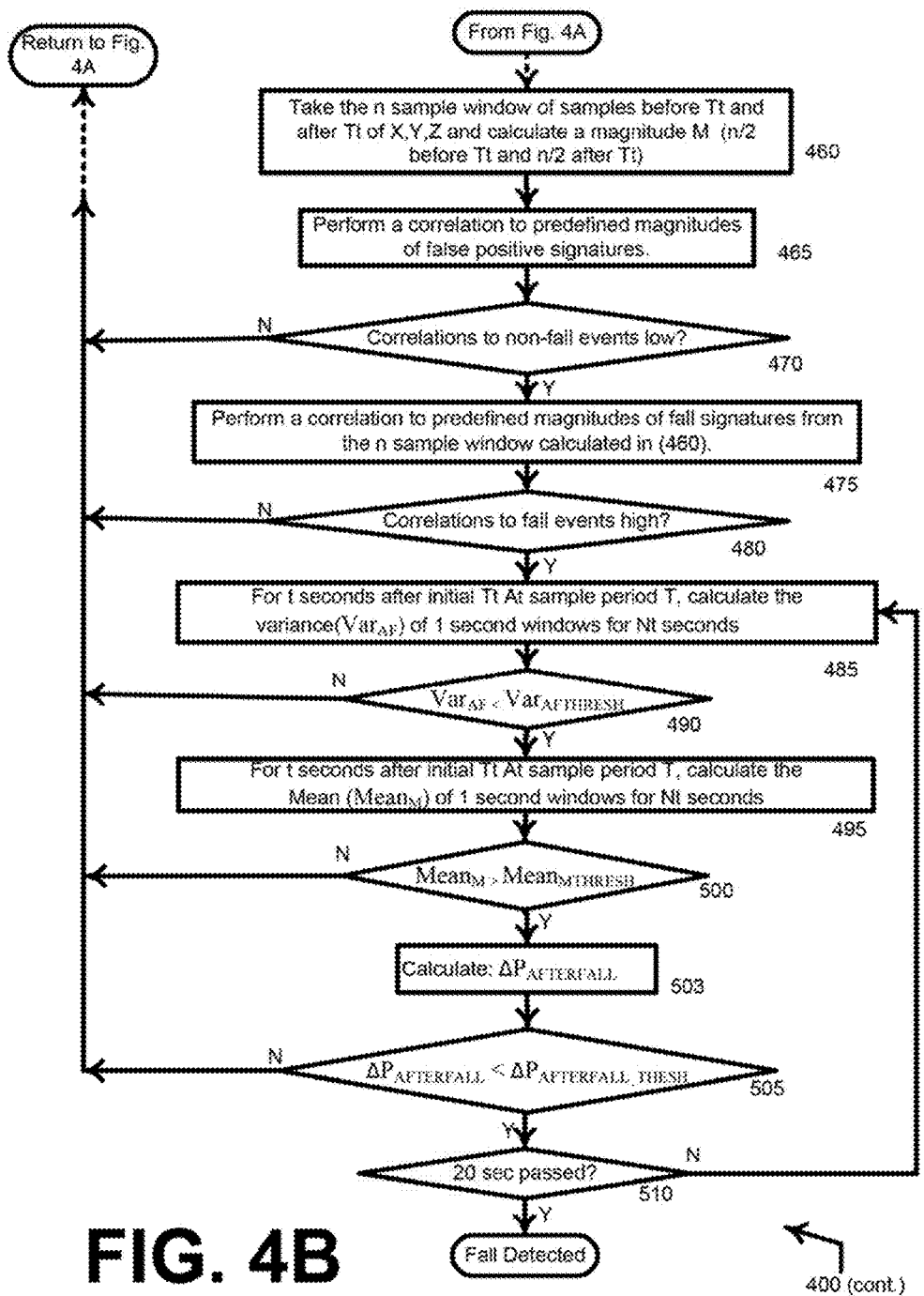

Turning now to description of FIG. 4B, at step 460, a subset of samples of the larger (six-second) event signature data window that contains the fall event is isolated. The subset window is n samples long and would be about 50 samples in total length if the accelerometer were sampled at 50 Hz for one second. This subset window's length is chosen to capture acceleration magnitude values before the impact event, wherein the larger event signature data window of samples is anchored around Tt.

At step 465, method 400 evaluates samples in the subset window isolated in step 460 using a correlation operation to compare the current data event data set to one or more predetermined composite data sets of known non-fall data sets in a non-fall data set library.

A composite data set comprises a single data set that results from performing inter-correlation among a plurality of data sets and characterizing and grouping the data sets so that data sets of a group have high correlation coefficients with respect to one another. For example, for a given number of non-fall data sets, data sets corresponding to, and acquired from, a wearer of an MPERS device sitting down in a chair would typically have a high correlation coefficient with one another. Similarly, data sets corresponding to a wearer lying down on a bed would also typically have a high correlation coefficient with one another. However, a data set corresponding to a sitting event would probably not have as high a correlation to one or more data sets corresponding to lying down on a bed. Thus, for data events corresponding to sitting events, a composite acceleration magnitude date set is generated for use in comparison to a current data set generated by a current, actual, and unknown event. At step 465, method 400 performs such a comparison and determines at step 470 whether the result of the correlation function performed at step 465 exceeds a predetermined criterion. If a data set for a current event meets a criterion, method 400 advances to step 475 and the data set corresponding to the current event is flagged as a possible fall event. If the evaluation at step 465 does not meet the criterion at step 470, method 400 returns to step 403 shown in FIG. 4A.

Figure 14:
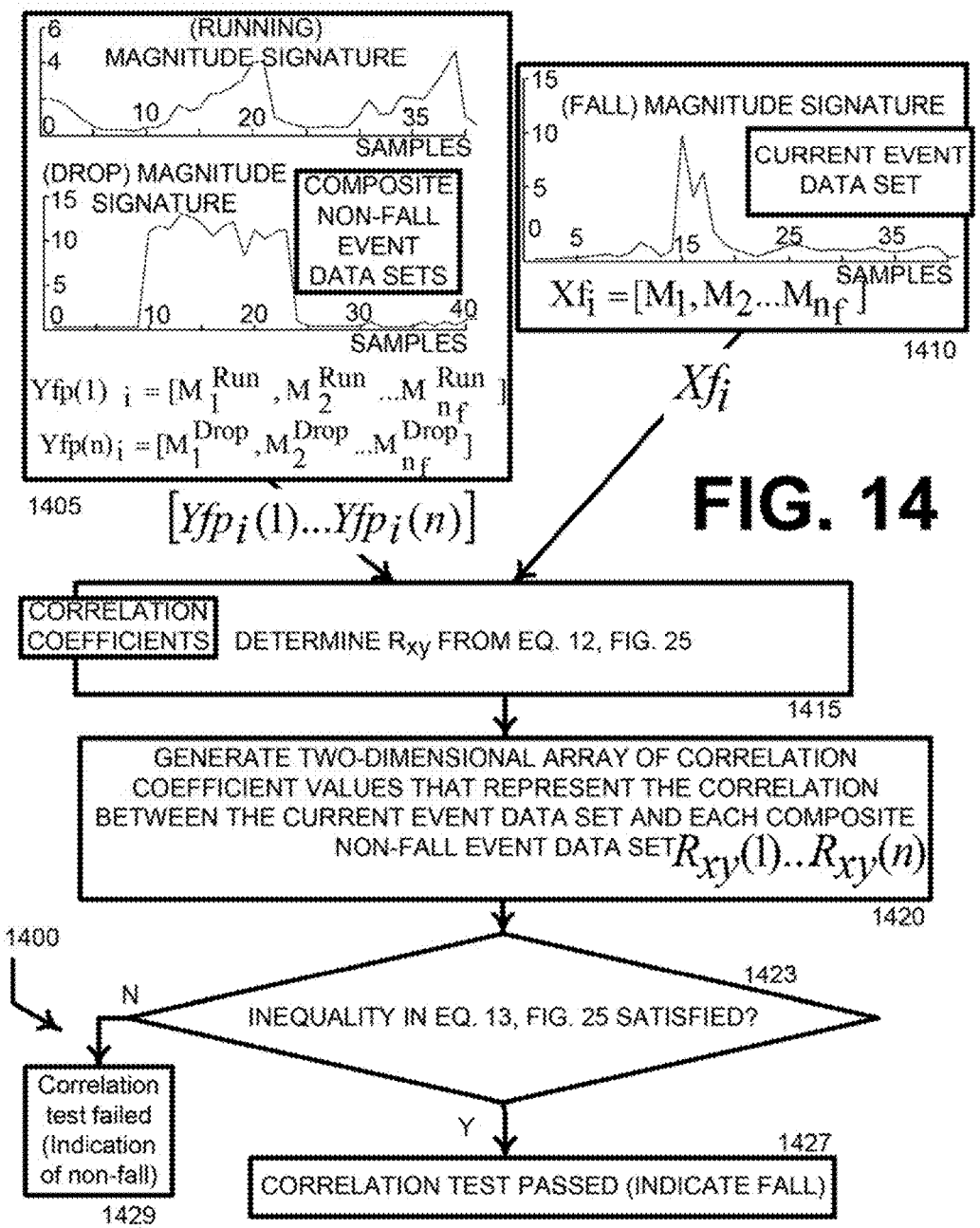
FIG. 14 illustrates a flow diagram of method for determining that a current event data set cannot be excluded as a non-fall event if the correlation of the current event data set with a composite data set for each group of a plurality of groups from a library of non-fall data sets is lower than the highest correlation coefficient of a known fall event data set to that particular composite data set.

FIG. 14 shows a flow diagram of method 1400, which shows details of steps 465 and 470 of FIG. 4B by which correlation is used to reduce the likelihood of a non-fall event resulting in a false positive indication that a fall event has occurred when analyzing a current event data set. A strong correlation with a composite non-fall event indicates that the current event data does not correspond to a fall event. Actual fall events manifest in event data in several different ways. Plots of different actual fall event data sets typically share basic characteristics that look similar, but cannot be classified as a single signature. Thus, when viewing a plot of acceleration magnitude versus time of an actual fall data set, or analyzing the data set digitally using an electronic computer device, it may be easier and is less computationally intensive to identify false positives by determining that an particular event data set does not contain certain of the characteristics that most actual fall event data sets contain, rather than classifying an event data set as a fall by comparing to a known fall data set. In the flow chart of FIG. 14, event data is correlated with one or more composite non-fall data sets and if the correlations are smaller than the correlation thresholds corresponding to the one or more composite non-fall data sets, a passing correlation test is produced indicating a fall event. In step 1405, multiple non-fall event data sets are analyzed and grouped according to event type as described above (i.e., drops are grouped with other drop events, sitting events are grouped with other sitting events, laying down events are grouped with other laying down events, etc.) based on data sets that have a high correlation with respect to one another. The determination of having high correlation to one another is based on a predetermined criterion. Preferably, data sets that have a correlation coefficient of about 0.85 or higher with respect one another would compose a particular group. After grouping, method 1400 determines a mean of the acceleration magnitude values of the data sets in a given group at step 1405, which results in a composite data set for that particular group of non-fall events. The composite data set is represented by Yfp wherein n is the number of non-fall event data sets that compose a particular group.

In step 1410, Xf represents a data set of acceleration magnitude values for a current event acquired from an MPERS device. At step 1415, method 400 performs a correlation function between each of one or more composite data sets (corresponding to one or more groups of non-fall events that have high correlation coefficients to one another) and the current event data set. At step 1420, method 400 generates an array of correlation coefficient values, wherein the number of values in the array corresponds to the number of composite data sets of the groups of non-fall events. In other words, method 400 performs step 1415 a number of times that equals the number of groups of non-fall event data sets having a composite data set to which the current event data set is correlated with. Each coefficient in the array generated at step 1420 is a correlation coefficient that results from performing a given iteration of step 1415.

At step 1423, method 1400 compares each coefficient in the array generated at step 1420 with an array of threshold values, wherein each threshold value corresponds to a given group of non-fall composite data sets (i.e., the threshold array includes a threshold value for a sitting event, another for a laying event, and perhaps another for a running event, etc.) The comparison at step 1423 is an inequality wherein the correlation coefficient from the array generated at step 1420 is compared to a corresponding threshold (i.e., a coefficient from correlating current event data with a sitting composite data set is compared to a threshold for a sitting event). Method 1400 compares the correlation coefficient for each coefficient in the array generated at step 1420 to its corresponding threshold. If the comparison at step 1423 determines that all of the coefficients determined at step 1420 are less than their corresponding threshold, method 1400 determines at step 1423 that the current event data set acquired at step 1410 is a fall event. A threshold in step 1423 represents a highest correlation coefficient between each of a number of known (empirical) fall event data sets and a composite data set for a particular group of non-fall events (i.e., a sitting composite dataset). Thus, if the current event data set is less like a given composite data set (because it exceeds the corresponding correlation threshold) than the known fall event that correlated the best with that same composite data set, the current event data set likely corresponds to a fall event and method 1400 indicates a fall at step 1427. On the other hand, a current event date set that correlates well with a particular composite data set of non-fall data set, as determine at step 1423 when the correlation coefficient exceeds the threshold corresponding to the composite data set's group, then the current event is likely a non-fall. This is so because a current event data set that is more like a composite data set of a non-fall group than is the fall event data set that correlates the best with the composite data set is likely a non-fall event. If the determination at step 1423 is that the current event data set is a non-fall event, method 400 indicates a non-fall at step 1429.

Figure 15:
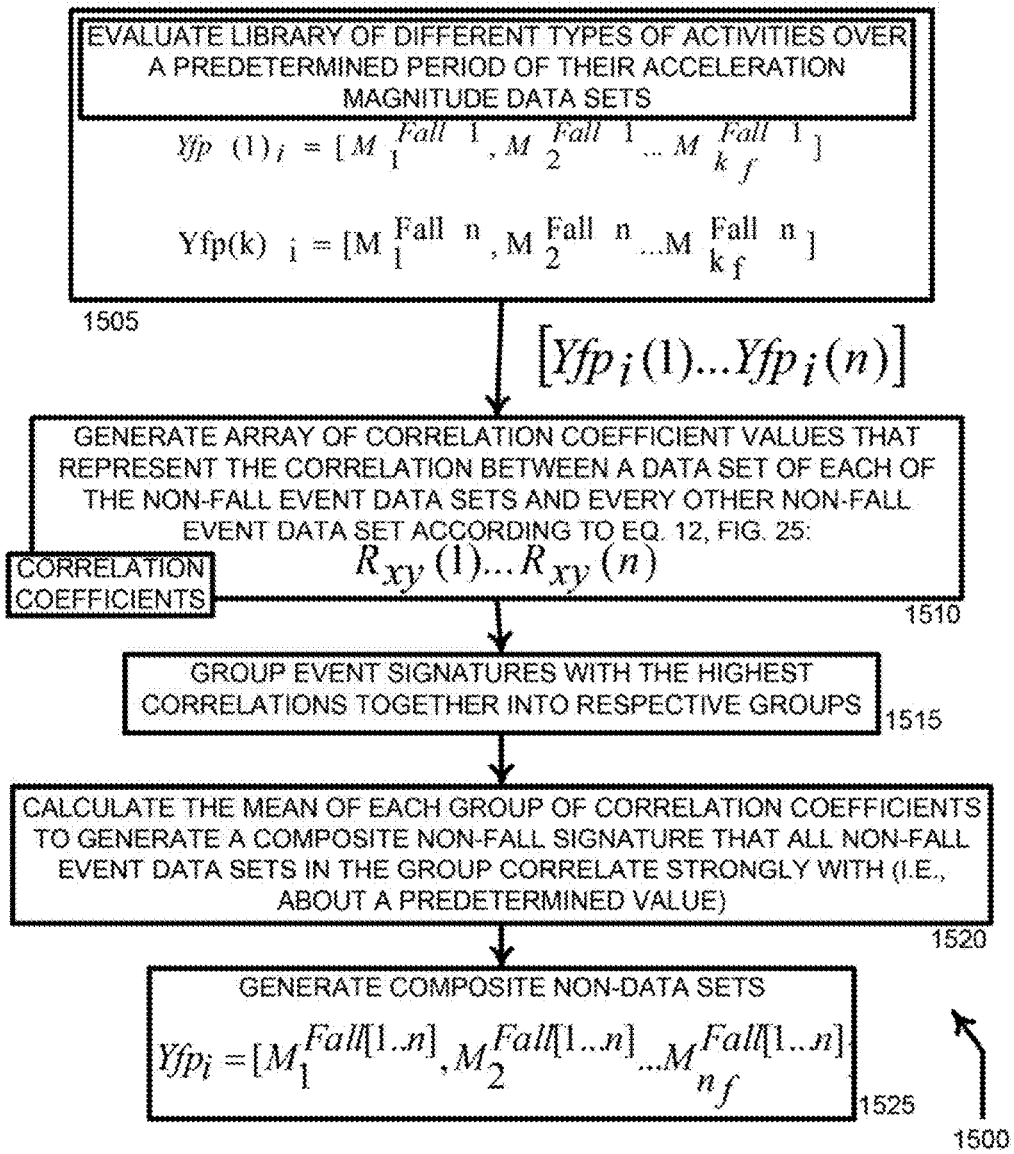
FIG. 15 illustrates a flow diagram of a method for generating a composite data set corresponding to a group of highly-correlated empirical data sets of non-fall event data.

Regarding the determination of a composite data set Yf used in method 1400, FIG. 15 illustrates a flow diagram of a method 1500 for determining the Yfp. At step 1505, method 1500 accesses a library of a plurality of non-fall event data sets represented as Yfp (1–nf), wherein nf represents the number of non-fall events in the library. At step 1510, method 1500 generates a three-dimensional nf×nf array that comprises correlation coefficients that result from performing a correlation of each non-fall data set with every other non-fall data set in the library. At step 1515, method 1500 groups the data sets so that within a given group, the data sets correlate highly with each other. 'High' correlation can be any predetermined correlation coefficient value, or higher, but preferably a coefficient of 0.85 is considered high. It will also be appreciated that steps 1510 and 1515 may be performed multiple times after an initial grouping of the data sets, for example to form subgroups within a group such as a group of fast sits within a larger grouping of sitting events.

At step 1520, method 1500 calculates a mean of all of the data sets within a particular group with respect to time to generate the composite data set. For example, each data set may be temporally arranged so that their respective maximum acceleration magnitude values (at Tt) align along the time axis having units of samples. The mean of all samples from the plurality of data sets within the group for a given time, or sample, is calculated and stored as the composite acceleration magnitude data set for the particular point in time for the group. After calculating the mean for each point in time of all the data sets in a group results in the composite data set (comprising the mean for each point in time) Yfp for each group 1-n. Method 1500 stores each group's composite data set to a memory at step 1525 for future use, such as in step 1415 in FIG. 14.

Figure 16:
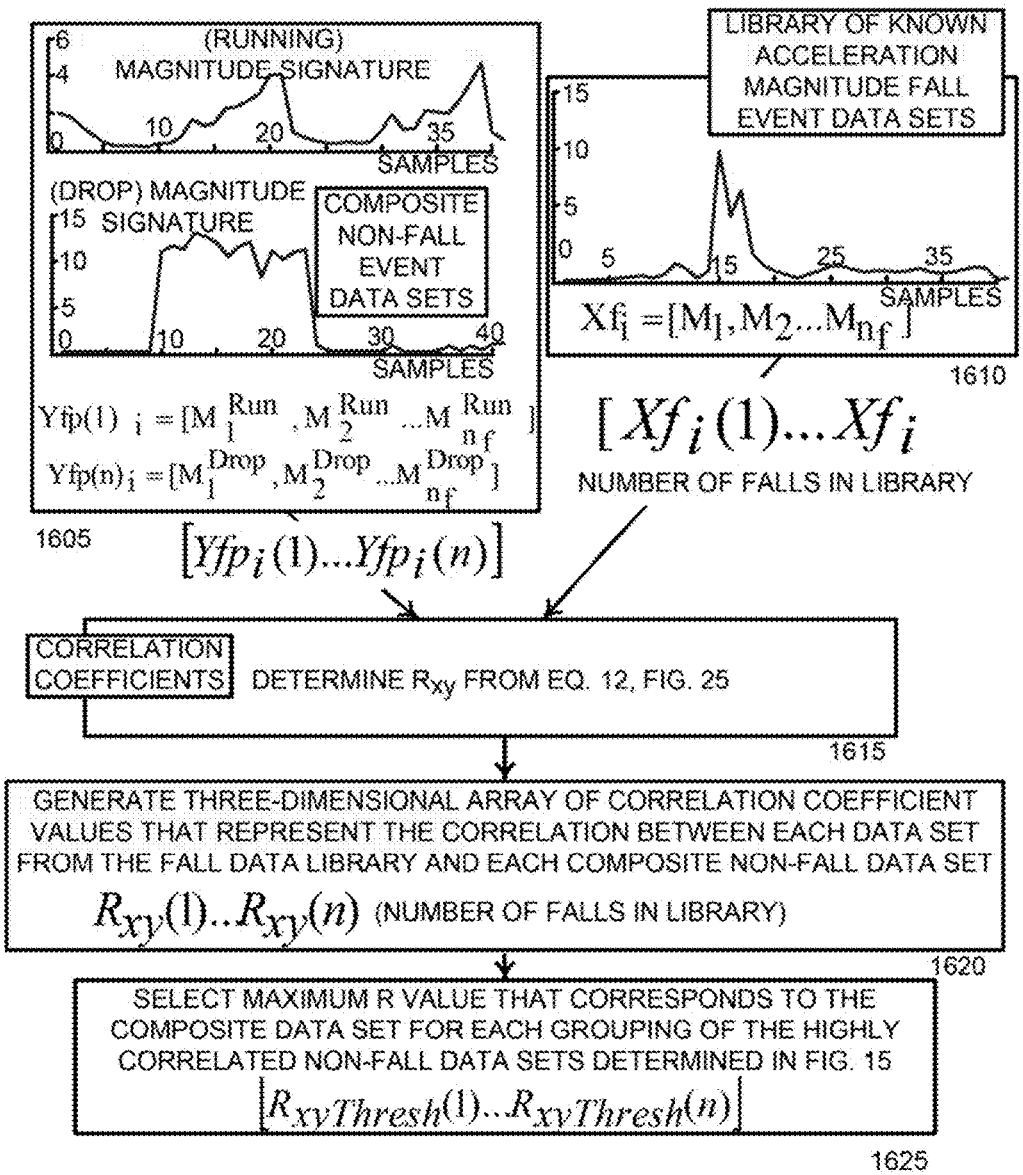

Turning now to determination of the thresholds used in step 1423, FIG. 16 illustrates a flow diagram of a method 1600 for determining the thresholds. At step 1605, method 1600 accesses a library of non-fall event composite data sets corresponding to a number of groups of different non-fall events n. At step 1610, method 1600 retrieves a data set corresponding to a known fall event from a library of empirically determined fall event data sets. At step 1615, method 1600 performs a correlation between a group's composite non-fall event data set and the known fall event data set for each known fall event in the fall event data set library. At step 1620, method 1600 generates a three dimensional array comprising a number of values equal to the number of known fall event data sets in the fall event data set library plus the number of composite non-fall data sets. Each value in the array generated at step 1620 is the correlation coefficient calculated at step 1615 between a composite data set and a known fall event data set. At step 1625, method 1600 selects the highest value from the array generated at step 1620 as the threshold corresponding to the given composite non-fall event data set, thus resulting in a two dimensional array comprising as many values as the number of composite non-fall data sets from step 1605. Steps 1615 and 1620 repeat for each composite data set Yfp. The thresholds from step 1625 corresponding to the non-fall event composite data sets are used in method 1400 at step 1423 as discussed above in reference to the description of FIG. 14.

Continuing with description of FIG. 4B, at step 475 method 400 performs a comparison to determine whether a current event data set correlates to predetermined composite fall data sets. This step includes similar steps as step 465, except rather than comparing current event data to one or more composite non-fall data sets, the comparison is to composite fall data sets.

Figure 17:
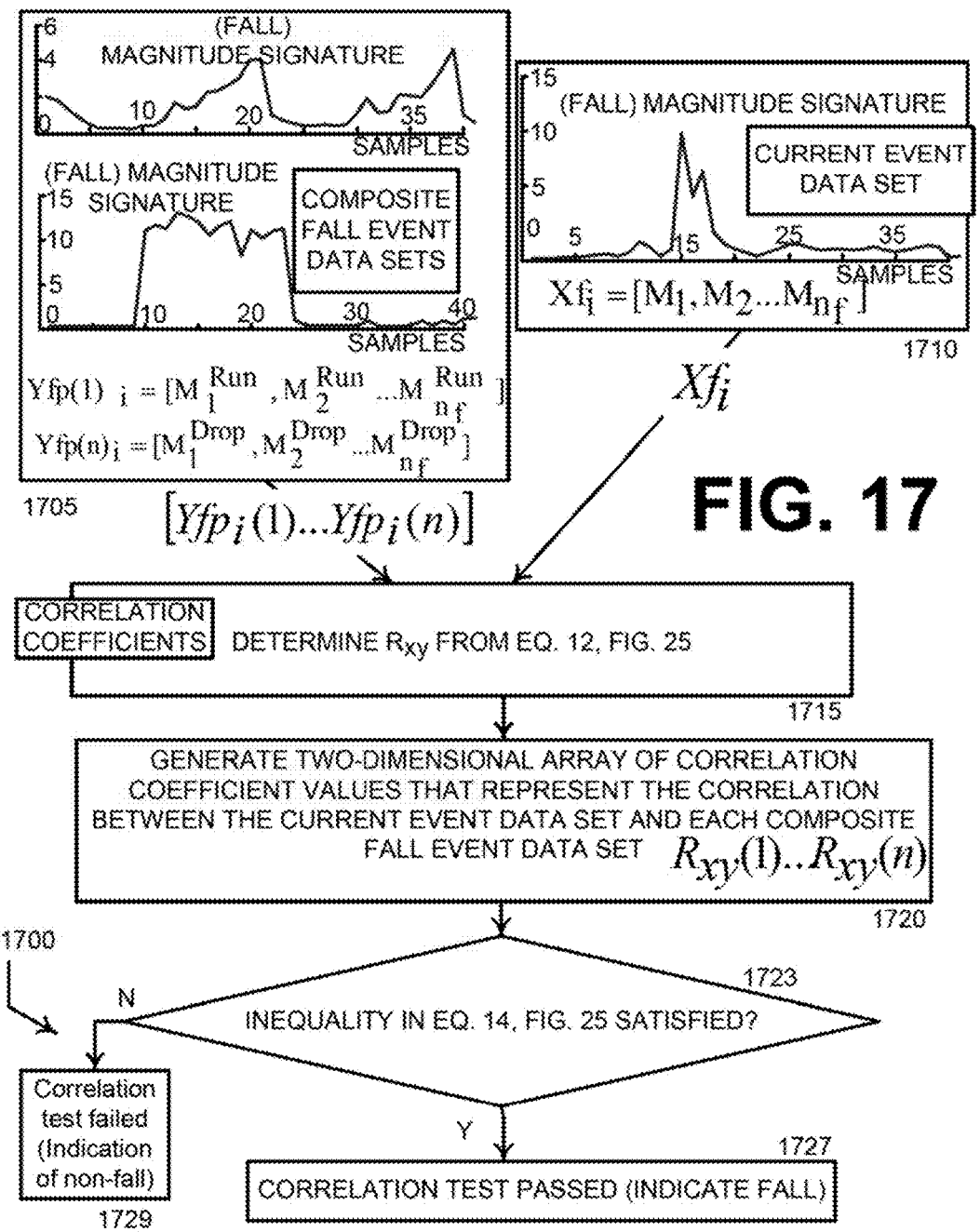
FIG. 17 illustrates a flow diagram of a method for comparing a current event data set with empirical data using a correlation criterion.

FIG. 17 shows a flow diagram of method 1700, which gives details of steps 475 and 480. In step 1705, method 1700 evaluates a collection, or library, of fall event data sets to determine one or more composite fall event data sets. At step 1710, method 1700 stores and processes a current event data set and at step 1715, the method performs a correlation with the current event data set and each of the composite fall event data sets. At step 1720 method 1700 stores the correlation coefficient resulting from the comparison of current event data to each composite fall event data set. At step 1723, method 1700 determines whether each coefficient in the array stored at step 1720 exceeds a threshold corresponding to the composite fall event data set from which the coefficient was determined. Rather than determining whether each coefficient is less than a threshold, as described in connection with step 1423 in FIG. 14, the inequality in step 1723 is a greater-than-operation because the thresholds in 1723 generated from 1925 and compared to the coefficients taken from step 1720 are determined using composite fall event data sets rather than composite non-fall event data sets. In contrast with FIG. 14, in FIG. 17 a high correlation coefficient determined at step 1715 indicates that the current event data set is likely a fall because the composite data set that it is being compared with is a composite fall event data set. If all coefficients exceed their corresponding thresholds, method 1700 indicates that the current event data set is a fall at step 1727 and control returns to step 480 in FIG. 4B. If a coefficient does not exceed its corresponding threshold, method 1700 indicates that the current event data set is not a fall at step 1729 and control returns to step 403 in FIG. 4A.

In summary, for a collection of event data sets of fall types that typically occur (falling backwards, falling forwards, twisting while falling, falling and grabbing onto objects while falling), the correlation between the signatures and potential fall data is calculated. If the correlation is high (greater than a predefined threshold, e.g., 0.85) between the potential fall data set (current event data set) and a given composite fall event data set, the potential fall can be classified as a fall. The reasoning behind using multiple fall event signatures is there are multiple ways for an individual to fall.

Figure 18:
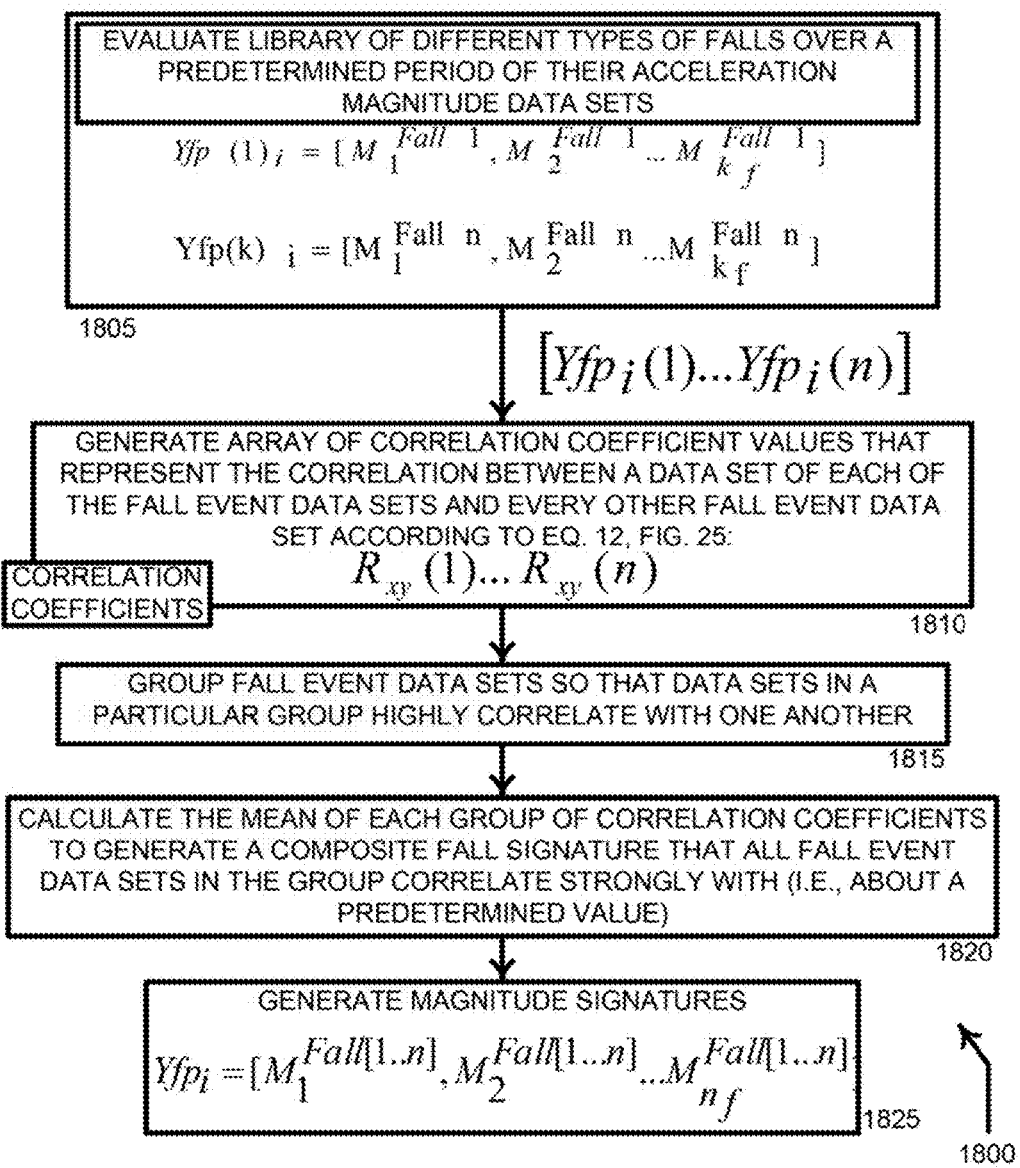
FIG. 18 illustrates a flow diagram of a method for generating a composite data set corresponding to a group of highly-correlated empirical data sets of fall event data.

FIG. 18 shows a method 1800 for determining composite fall data sets by correlating all the fall event data sets of a library of empirically determined fall event data sets then grouping them according to correlation coefficients that indicate similar event characteristics among the data sets in the group (i.e., the data sets within a group when correlated with each other have a correlation coefficient higher than a predetermined criterion). With fall event data sets grouped together, they are averaged, or the mean taken, to generate each composite fall event data set. The mean calculation at step 1820 operates on the acceleration sample values for each data set in the library after the data sets have been temporally aligned using an acceleration magnitude trigger Tt in each data set as a time reference. Method 1800 is similar to method 1500 inasmuch as it determines one or more composite data sets, with the difference being that in method 1500 the composite data sets are non-fall event data sets and in 1800 they are fall event data sets. Thus, the description of method 1500 shown in FIG. 15 provides more detail of the corresponding steps of method 1800.

Figure 19:
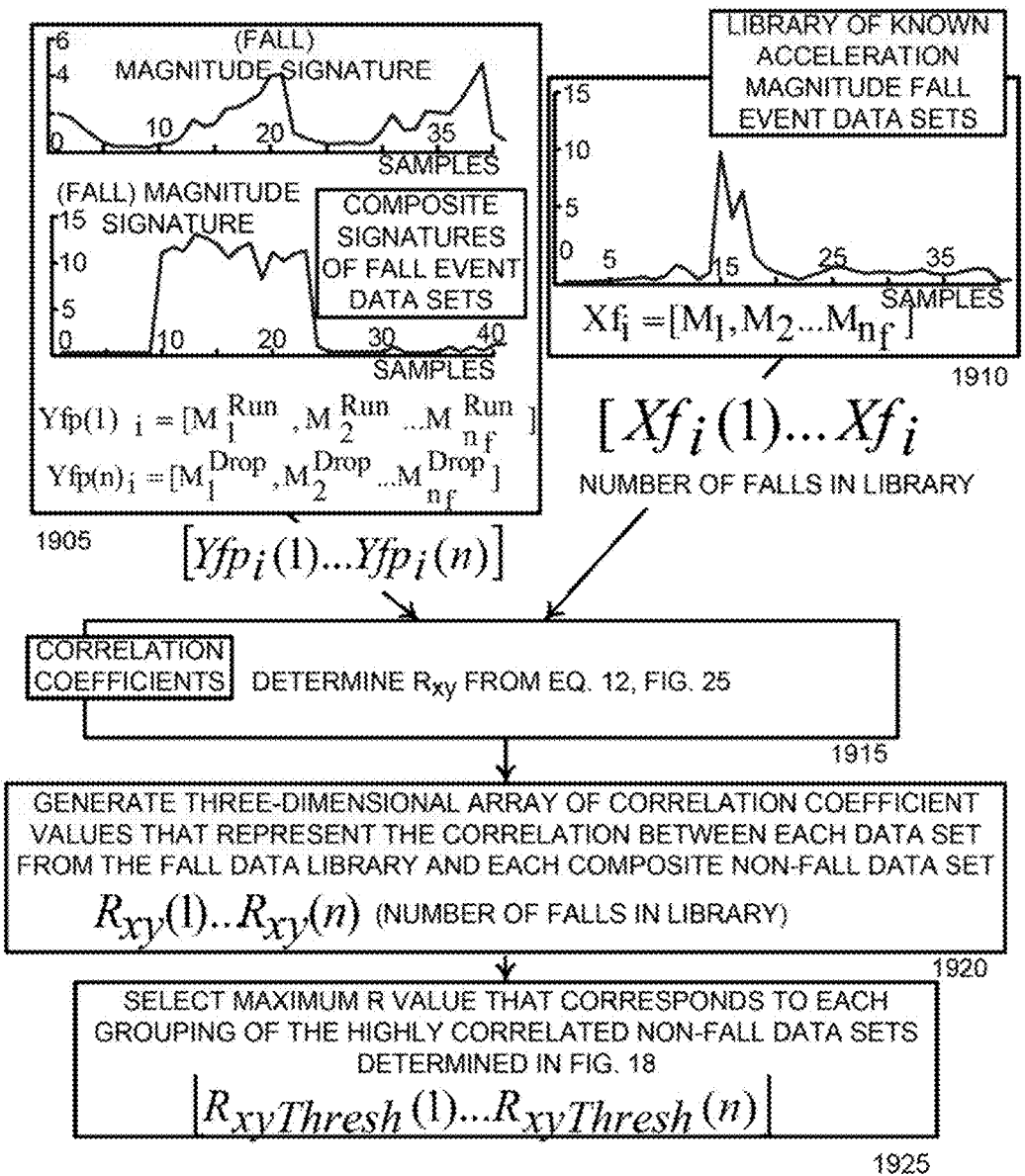

FIG. 19 shows a method 1900 for calculating thresholds used in step 1723 of FIG. 17. Method 1900 is similar to method 1600 described in connection with FIG. 16. However, in method 1900, step 1905 retrieves fall event data sets from a library, or memory, and step 1915 performs a correlation of each fall event data set 1910 with each composite fall event data set as determined in method 1800 of FIG. 18. At step 1920, method 1900 generates a three dimensional array of the correlation coefficients that result from step 1915, and at step 1925 the method stores the lowest correlation coefficient determined for each composite fall event data set as the threshold for that particular composite fall event data set. This is different than in step 1625 in FIG. 16 because in method 1400 of FIG. 14, step 1423 performs a less-than operation of coefficients that resulted from correlating current event data sets with composite non-fall data sets. In step 1423, a coefficient less than the threshold indicates that the current event data set is not very similar to a non-fall event and is likely a fall. In contrast, in step 1723 of FIG. 17, method 1700 compares a correlation coefficient, determined from comparing a current event data set with a composite fall data set, to a threshold. Thus, a high correlation coefficient compared to a threshold determined from a fall event data set indicates that the current data set is likely a fall, but having the coefficient chosen as the lowest of the array determined at step 1920 for each composite fall event data set reduces the likelihood that the comparison at step 1723 will result in deeming an actual fall event as a non-fall.

Returning to discussion of FIG. 4B, method 400 determines whether an MPERS device measures changes in accelerometer output signal(s) after it has determined that a fall has likely occurred. This further reduces the likelihood of the MPERS indicating that a fall has occurred if a fall did not occur. At step 485 after one or more of the previously described steps (or other steps of methods for to determining a fall) have indicated that a current event was a fall event, method 400 confirms that little, or no, movement of the MPERS device is occurring by evaluating accelerometer data for variation. Equation 3 takes the variance of acceleration magnitude in increments of T seconds (inverse of the sample rate, which is preferably 50 samples per second). This equation assumes that 1 is the first index (or sample label) and t/T is the last sample in a sampling window for calculating accelerometer output variance. A typical value of t would be one-second if sampling at 50 Hz. Indicated in FIG. 4B at step 485, the calculation of variance starts t seconds after Tt, where a typical value of t is 3 seconds. A typical time spent taking one second windows of data and performing the variance check to see if the person has gotten off the ground is 20 seconds, as indicated by step 510. Thus, $$Var_{AF} = \left| \frac{1}{t/T} \sum_{i=1}^{t/T} \left( M_i - \left( \frac{1}{t/T} \sum_{i=1}^{t/T} M_i \right) \right)^2 \right| \quad (EQ\ 3)$$

At step 490, method 400 determines whether the variance is less than a predetermined variance threshold. If yes, method 400 determines that a person wearing the MPERS device is not moving and an incapacitating fall has occurred and the method returns to step 490. If the determination is no at step 490 then method 400 determines that the person has moved during an amount of time t. Preferably, after previous steps have indicated a current event is a fall event, method 400 performs an acceleration variance check every t seconds. If low variance (below the predetermined threshold) in acceleration signal samples is determined during an interval t, then the MPERS device determines that a fall has occurred. However, to further reduce the likelihood of the MPERS device indicating a fall event if a fall did not in fact occur, rather than advancing to step 495, method 400 can repeat steps 480 and 485 a predetermined number of times when the variance of the initial t seconds of samples is less than the predetermined variance threshold. Otherwise, after determining a low variance at step 490, method 400 advances to step 495.

At step 495, like the variance calculation, a change in mean from the sample immediately after a fall has occurred (i.e., after the preferable three seconds in an event window following a trigger as indicated by Tt in the flow chart) is calculated for at second window of time using EQ. 4. After t second(s) of data has been collected in the buffer after a fall event has occurred as indicated by Tt, the difference in the mean magnitude between the first second after t/T is calculated (a typical initial value of t is three then the value of t is changed to 1 to take one-second windows). One-second windows of data are evaluated as indicated in step 485 to check for a mean differential change. This window is the same window of data taken in step 485 but placed in the flow chart to indicate that a one-second window of data exists. This equation assumes that 1 is the first index a short period after t/T, a typical value would be 50 samples or 1 second of data if sampling at 50 Hz. Thus, $$\text{Mean}_M = \left( \frac{1}{t/T} \sum_{i=1/T}^{t/T+1/T} M_i \right) - \frac{1}{1/T} \sum_{j=1}^{1/T} M_j \quad (EQ\ 4)$$

At step 500, if the $\text{Mean}_M$ value is greater than a threshold value, which is typically an empirically verified value that highly correlates to little, or no, movement while a person lies on a floor, then the test for movement is satisfactory and method 400 advances to step 503. If the mean $\text{Mean}_M$ value is less than the threshold at step 500, method returns to step 403. The mean value calculated will probably dip below the mean threshold based on movement of a person getting up.

Returning to step 503, method 400 calculates a change in pressure according to EQs 5 and 6. Twenty samples after Tt, $\Delta P_{1sec}$ (EQ. 5) is calculated which is the average pressure on the ground during a one second interval that begins twenty samples after an event window ends. For one-second intervals assuming 5 Hz barometric pressure readings, $\Delta P_{afterfall}$ (EQ. 6) is calculated for data acquired during a one second interval that begins immediately after the event window ends. $P_i$ is the pressure value array that stores barometric pressure samples during one-second intervals. Thus, $\Delta P_{afterfall}$ is the difference between the average pressure during the first five samples after an event signature window (preferably six seconds) ends and the average of the five pressure samples acquired during the interval beginning with the twentieth sample after the event signature window closes.

$$\Delta P_{1sec} = \sum_{i=Tt+20}^{Tt+25} P_i \quad (EQ\ 5)$$

$$\Delta P_{afterfall} = \sum_{i=currentsample}^{currentsample+5} P_i - \Delta P_{1sec} \quad (EQ\ 6)$$

At step 505, method 400 compares $\Delta P_{afterfall}$ to a predetermined pressure threshold. If $\Delta P_{afterfall}$ exceeds the threshold, method 400 returns to step 403. If $\Delta P_{afterfall}$ is less than the threshold, then method 400 advances to step 510.

At step 510, a timer of a configurable predetermined value (20 seconds shown in the figure) begins and method 400 returns to step 485 if the timer has not counted down. Upon encountering step 510 and the timer indicates it has counted down, method 400 advances to step 515 and indicates that a fall has occurred. The timer permits a configurable number of iterations of acceleration variance comparison of step 490, the acceleration mean comparison of step 500, and the pressure change comparison of step 505 to further reduce the likelihood that an MPERS device running method 400 characterizes a current event data set as a fall event at step 515 if the event was actually a non-fall event. If (510) $\Delta P_{afterfall}$ is then compared with $\Delta P_{afterfall\_thresh}$ (EQ. 7) to determine if the value changes so that the pressure is restored to a level −10 Pa less than the current averaged reading.

$$\Delta P_{afterfall\_thresh} = -10\ \text{Pa} \quad (EQ.\ 7)$$

The post-fall threshold ($\Delta P_{afterfall\_thresh}$) shown in EQ. 7 is given for a typical change in pressure that is present for a person getting up off the ground after a fall. This portion of the method checks to if after the method indicates that a person is on the ground that the person returns from the ground and thus cancels the indication that a fall has been detected—if a person is not incapacitated then it is not necessary to provide a fall alert.

Figure 20:
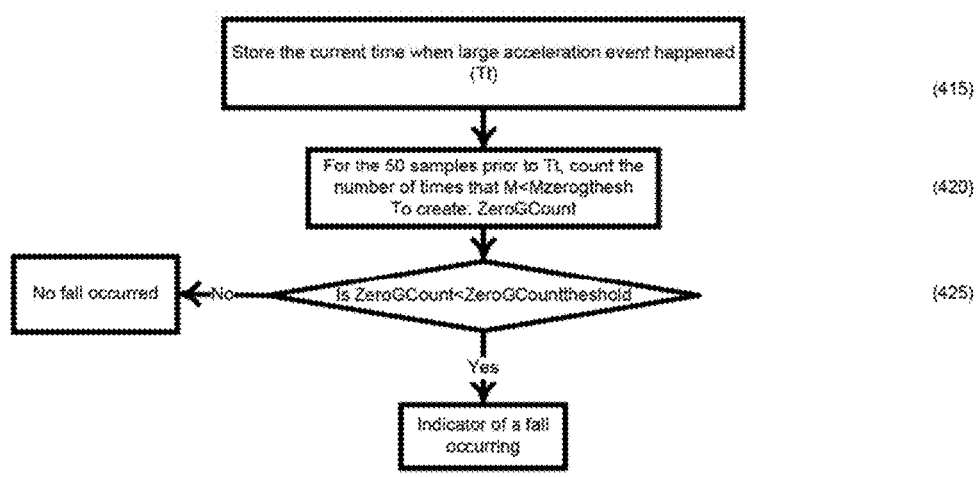
FIG. 20 illustrates a flow diagram for compensating for spin of a device having an accelerometer sensor to increase accuracy of fall detection.

Turning now to FIG. 20, the figure shows an excerpt of method 400 from FIG. 4A. Line 420 performs a false positive check to provide an indication whether a current event is a fall or non-fall event. However, these steps may fail to determine that a current event is a fall event if the MPERS device is turning/spinning while the device experiences free-fall.

Figure 21:
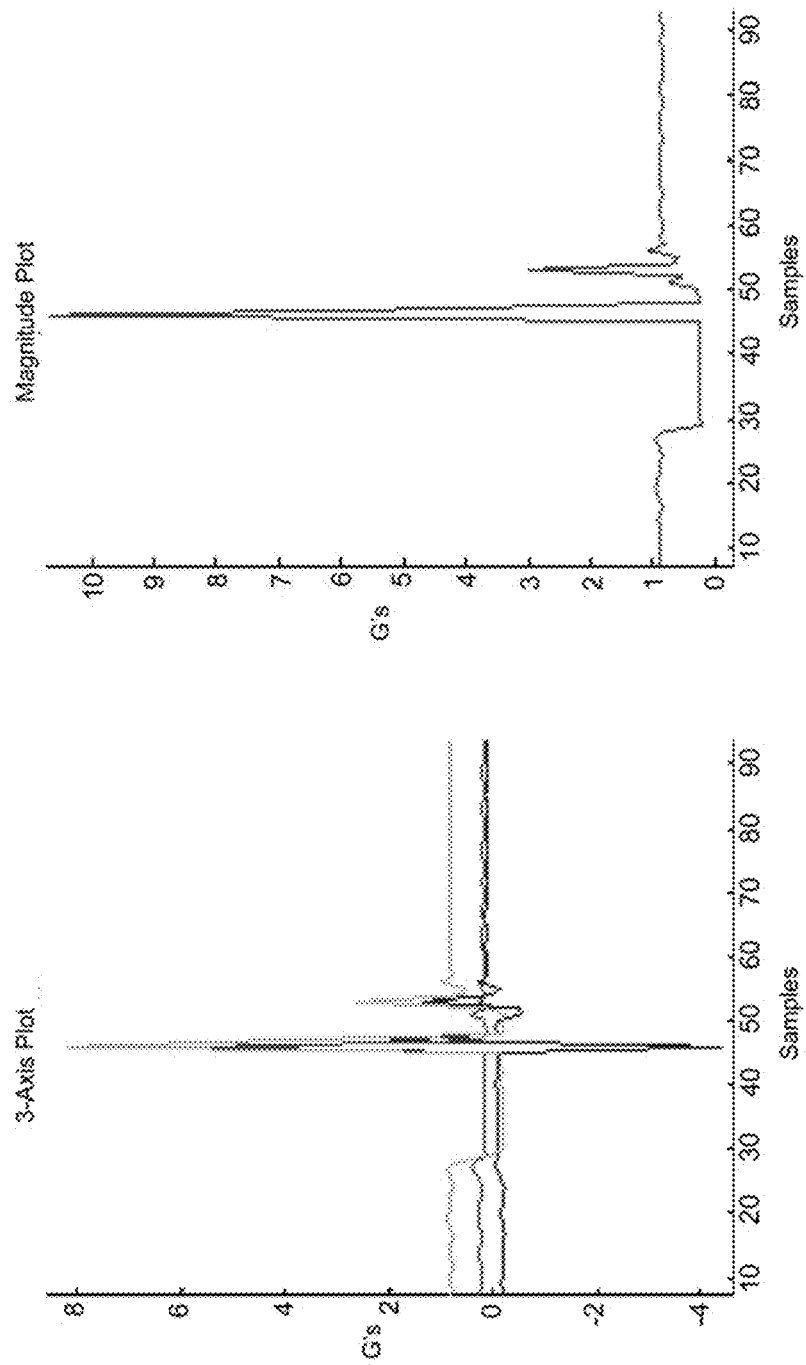
FIG. 21 illustrates a plot of a device having accelerometer sensors not spinning as it drops.
Figure 22:
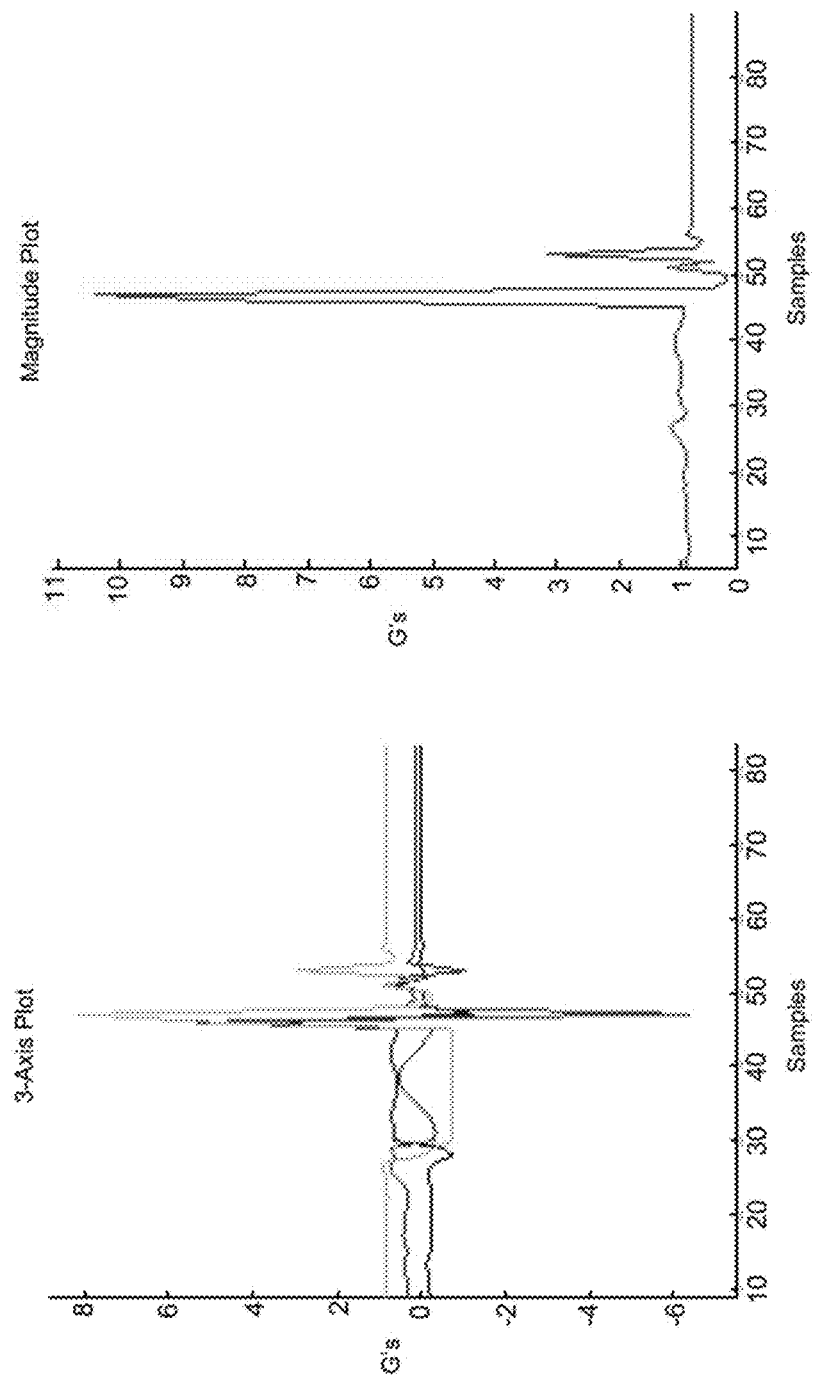
FIG. 22 illustrates a plot of a device having accelerometer sensors spinning as it drops.

Acceleration signatures of a typical fall event with the device not spinning is shown in FIG. 21 (the plot on the left corresponds to X, Y, Z data and the plot on the right corresponds to the magnitude of the three axis accelerometer). In contrast, FIG. 22 shows acceleration signatures of a fall event with the device spinning (the plot on the left corresponds to X, Y, Z data and the plot on the right corresponds to the magnitude of the three axis accelerometer). The difference between the two figures is that the magnitude in FIG. 21 does not dip down below a magnitude threshold of approximately 1 G because angular velocity causes changing velocity (i.e., acceleration) present while spinning and free falling. To compensate for the acceleration on the MPERS device caused by the angular velocity, which may result in a magnitude of the acceleration signals not approaching a typical free-fall threshold, and thus indicating a fall event when in reality the MPERS device may be spinning while being tossed to the floor, the changing angular velocity is determined and used as a factor that scales an acceleration magnitude before calculating the ZeroGCount value (number of times the acceleration magnitude crosses the free-fall threshold during the three-second portion of the event window that precedes the trigger event Tt.

To calculate the angular velocity in the period before the point that a large magnitude occurs (Tt), acceleration values for each axis (X,Y,Z) are evaluated to determine changes between positive and negative values. The change from positive to negative values indicates a substantially sinusoidal changing of acceleration magnitude of the signal corresponding to the given axis under evaluation, and a period is calculated from varying signal's magnitude and then used to determine an angular acceleration of the MPERS device about the given axis. The angular acceleration is perpendicular to the direction of radial velocity and is proportional to the radius. The radius is estimated for the fall detection device and is given the value r.

With an estimation of r, drop test are performed by spinning the MPERS device with larger and smaller amounts of angular velocity. The acceleration magnitudes are then scaled down for each axis separately based on the period experimentally determined with sets of drop data.

Evaluating samples during an interval one second prior to the acceleration event Tt can help determine if an MPERS device is spinning while falling after a large magnitude has been detected. For the three axes X,Y,Z in a short time period, such as 1 second, prior to the Tt acceleration magnitude, the number of zero crossings is counted. If the number of zero crossings is greater than 3 then the device made greater than 1.5 revolutions during the current event. An accelerometer attached to a person will typically not rotate more than 1.5 times so it can be concluded that a fall has likely occurred.

Figure 23:
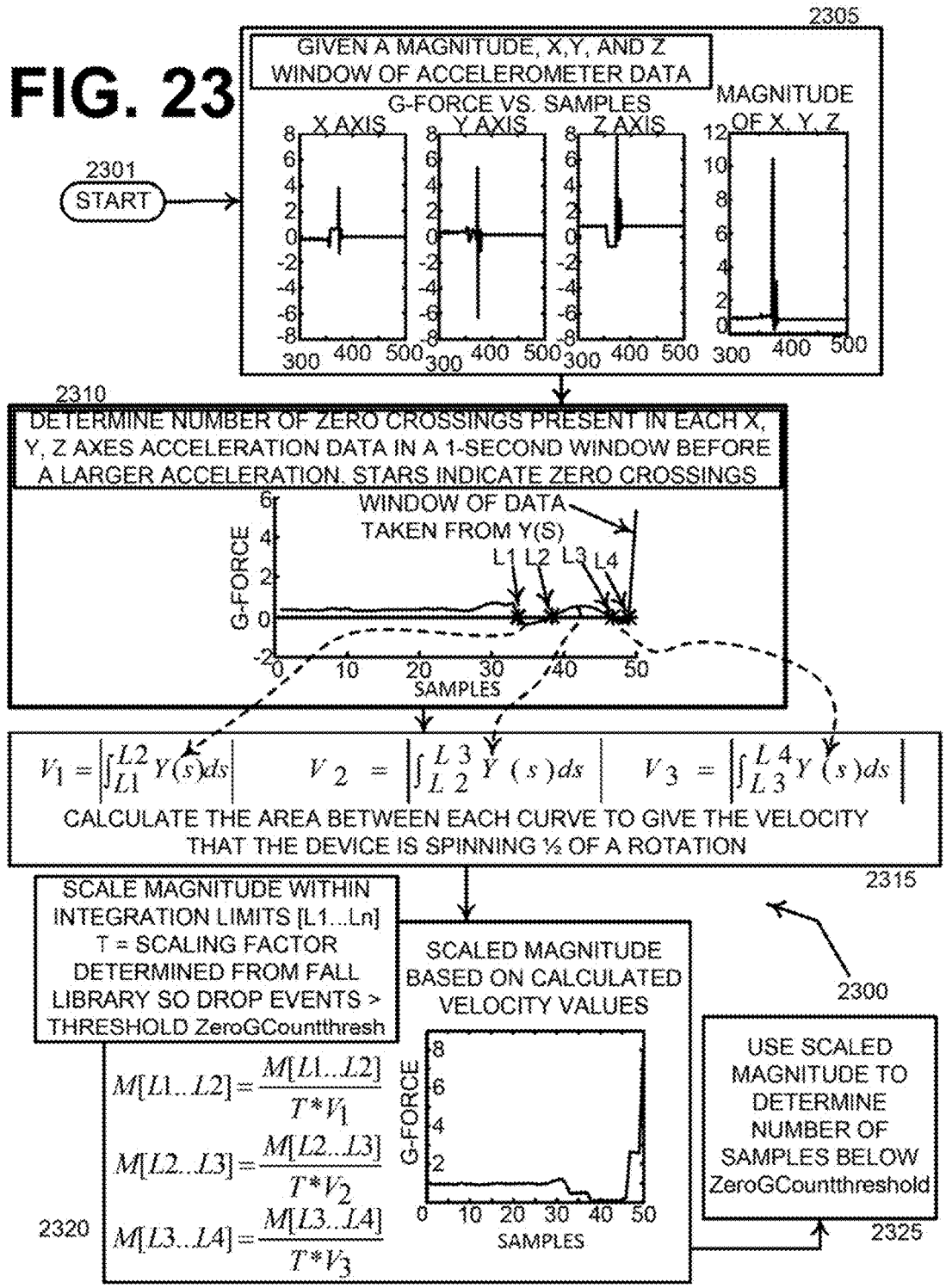
FIG. 23 illustrates a flow diagram of a method for determining from the acceleration outputs of a spinning device having three axis accelerometer sensors the amount of time the device is in free fall during a current event.

Method 2300 pictured in FIG. 23 shows a method to scale the acceleration magnitude window from the angular velocity present in the particular X,Y,Z axes. Method 2300 starts at line 2301. At step 2305, method 2300 indicates an event window of X, Y, Z accelerometer data. At step 2310, the event window is checked for zero crossings to determine if zero crossings are present in the X,Y,Z axes. If zero crossings are present, they are used for limits of integration to compute the velocity for each half rotation in step 2315 (the dashed lines show correspondence between the area of integration and the respective integral). The area between the zero crossings represents the amount of angular velocity present in motion of the device that the signal represents. The method progresses to step 2320 and uses the computed angular velocity for each interval of integration to scale acceleration magnitude data for the corresponding integration interval for each acceleration component signal and scales same between the zero crossings. In step 2320, a value T is determined from the integration and from empirical data from processing a library of known event data sets that have known angular velocities. T is an empirically derived number that when applied to the acceleration magnitude signature adjusts the magnitude during free-fall to a value associated with a typical fall or non-fall without spin. The scaled component acceleration signals can be used to determine a scaled acceleration magnitude according to EQ. 1. The scaled acceleration magnitude (M) can then be used rather than using the magnitude of the unscaled acceleration signals.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method, comprising:
   receiving, by a server and from a mobile device, a plurality of accelerometer values generated by the mobile device;
   determining, by the server and based on the plurality of accelerometer values, a plurality of acceleration magnitude values;
   determining, by the server, that at least one of the plurality of acceleration magnitude values satisfies an acceleration magnitude threshold;
   identifying, by the server, a potential fall event at a time period based on the at least one of the plurality of acceleration magnitude values satisfying the acceleration magnitude threshold,
      the plurality of acceleration magnitude values including a set of acceleration magnitude values corresponding to a set of time periods prior to the time period;
   determining, by the server and based on identifying the potential fall event, a quantity of the set of acceleration magnitude values that are below a free fall magnitude threshold;
   determining, by the server, a total free fall interval based on the quantity of the set of acceleration magnitude values that are below the free fall magnitude threshold;
   determining, by the server, that the total free fall interval satisfies a free fall interval threshold;
   determining, by the server and based on the total free fall interval satisfying the free fall interval threshold, that a non-fall event occurred; and
   transmitting, by the server and to a service provider device, an indication that the non-fall event occurred to indicate that the potential fall event is a false positive.

2. The method of claim 1, further comprising:
storing acceleration data generated from an accelerometer device of the mobile device during an event signature window,
where the event signature window is an amount of time before an acceleration magnitude signal from the accelerometer device meets a criterion;
storing the acceleration data as a fall event data set in a fall event data set library if the acceleration data resulted from a fall event; and
storing the acceleration data as a non-fall event data set in a non-fall event data set library if the acceleration data resulted from a non-fall event.

3. The method of claim 2, further comprising:
determining maximum acceleration magnitude values from a plurality of fall event data sets in the fall event data set library; and
identifying a minimum of the maximum acceleration magnitude values as the acceleration magnitude threshold.

4. The method of claim 3, further comprising:
determining, for the plurality of fall event data sets in the fall event data set library, free fall intervals that precede respective maximum acceleration magnitude values;
identifying, for the plurality of fall event data sets in the fall event data set library, minimum acceleration magnitude values during the free fall intervals; and
determining, from the plurality of fall event data sets in the fall event data set library, a maximum of the minimum acceleration magnitude values during the respective free fall intervals as the free fall magnitude threshold.

5. The method of claim 1, further comprising:
determining, based on the non-fall event occurring, a plurality of acceleration component values from the set of acceleration magnitude values,
the plurality of acceleration component values corresponding to an acceleration component along one of a plurality of perpendicular axes of the set of acceleration magnitude values;
determining, for the plurality of acceleration component values, a number of zero-axis crossing events; and
determining that the non-fall event occurred if the number of zero-axis crossing events is greater than one.

6. The method of claim 5, further comprising:
integrating acceleration magnitude values, of the plurality of acceleration magnitude values, corresponding to each of the plurality of acceleration component values between two zero-axis crossing events;
scaling, based on integrating the acceleration magnitude values, the acceleration component values between the two zero-axis crossing events to adjust the acceleration component values to values comparable to a fall event or to a non-fall event without spin;
computing, based on scaling the acceleration component values, scaled acceleration magnitudes; and
using the scaled acceleration magnitudes as the acceleration magnitude values.

7. The method of claim 1, further comprising:
determining a plurality of other free fall intervals; and
identifying a longest free fall interval of the plurality of other free fall intervals,
where the free fall interval threshold is the longest free fall interval.

8. The method of claim 1, further comprising:
performing, based on the non-fall event occurring, a correlation function based on a plurality of composite non-fall event data sets to produce a plurality of correlation coefficients; and
determining, based on performing the correlation function, that the non-fall event occurred if the plurality of correlation coefficients satisfies a respective threshold corresponding to the plurality of composite non-fall event data sets.

9. The method of claim 1, further comprising:
performing, based on the non-fall event occurring, a correlation function based on a plurality of composite fall event data sets to produce a plurality of correlation coefficients; and determining, based on performing the correlation function, that the non-fall event occurred if one of the plurality of correlation coefficients is less than a respective threshold corresponding to the plurality of composite fall event data sets.

10. A device, comprising:
one or more processors to:
receive a plurality of accelerometer values generated by a mobile device;
determine, based on receiving the plurality of accelerometer values, a plurality of acceleration magnitude values;
determine that at least one of the plurality of acceleration magnitude values satisfies an acceleration magnitude threshold;
identify a potential fall event at a time period based on the at least one of the plurality of acceleration magnitude values satisfying the acceleration magnitude threshold,
the plurality of acceleration magnitude values including a set of acceleration magnitude values corresponding to a set of time periods prior to the time period;
determine, based on identifying the potential fall event, a quantity of the set of acceleration magnitude values that are below a free fall magnitude threshold;
determine a total free fall interval based on the quantity of the set of acceleration magnitude values that are below the free fall magnitude threshold;
determine that the total free fall interval satisfies a free fall interval threshold;
determine, based on the total free fall interval satisfying the free fall interval threshold, that a non-fall event occurred; and
transmit, to a service provider device, a signal that the non-fall event occurred to indicate that the potential fall event is a false positive.

11. The device of claim 10, where the one or more processors are further to:
determine, based on the non-fall event occurring, a plurality of acceleration component values from the set of acceleration magnitude values,
the plurality of acceleration component values corresponding to an acceleration component along one of a plurality of perpendicular axes of the set of acceleration magnitude values;
determine, for the plurality of acceleration component values, a number of zero-axis crossing events; and
determine that the non-fall event occurred if the number of zero-axis crossing events is greater than one.

12. The device of claim 11, where the one or more processors are further to:
  integrate acceleration magnitude values, of the plurality of acceleration magnitude values, corresponding to each of the plurality of acceleration component values that occur between two zero-axis crossing events;
  scale, based on integrating the acceleration magnitude values, the acceleration component values between the two zero-axis crossing events to adjust the acceleration component values to values comparable to a fall event or to a non-fall event without spin;
  compute, based on scaling the acceleration component values, scaled acceleration magnitudes; and
  use the scaled acceleration magnitudes as the acceleration magnitude values.

13. The device of claim 10, where the one or more processors are further to:
  determine a plurality of other free fall intervals; and
  identify a longest free fall interval of the plurality of other free fall intervals, where the free fall interval threshold is the longest free fall interval.

14. The device of claim 10, where the one or more processors are further to:
  perform, based on the non-fall event occurring, a correlation function based on a plurality of composite non-fall event data sets to produce a plurality of correlation coefficients; and
  determine, based on performing the correlation function, that the non-fall event occurred if the plurality of correlation coefficients satisfies a respective threshold corresponding to the plurality of composite non-fall event data sets.

15. The device of claim 10, where the one or more processors are further to:
  perform, based on the non-fall event occurring, a correlation function based on a plurality of composite fall event data sets to produce a plurality of correlation coefficients; and
  determine, based on performing the correlation function, that the non-fall event occurred if one of the plurality of correlation coefficients is less than a respective threshold corresponding to the plurality of composite fall event data sets.

16. A method, comprising:
  receiving, by a server, acceleration data from an accelerometer device,
    the acceleration data comprising a plurality of accelerometer values;
  storing, by the server, the acceleration data corresponding to an event signature window,
    the event signature window being an amount of time before a potential fall event;
  determining, by the server and based on the plurality of accelerometer values, a plurality of acceleration magnitude values;
  determining, by the server, that at least one of the plurality of acceleration magnitude values satisfies an acceleration magnitude threshold;
  identifying, by the server, flail the potential fall event at a time period based on the at least one of the plurality of acceleration magnitude values satisfying the acceleration magnitude threshold,
    the plurality of acceleration magnitude values including a set of acceleration magnitude values corresponding to a set of time periods prior to the time period, and
    the set of time periods prior to the time period corresponding to the event signature window;
  determining, by the server and based on identifying the potential fall event, a quantity of the set of acceleration magnitude values that are below a free fall magnitude threshold;
  determining, by the server, a total free fall interval based on the quantity of the set of acceleration magnitude values that are below the free fall magnitude threshold;
  storing, by the server, the acceleration data as a fall event data set in a fall event data set library if the total free fall interval is less than a free fall interval threshold; and
  storing, by the server, the acceleration data as a non-fall event data set in a non-fall event data set library if the total free fall interval satisfies the free fall interval threshold,
    the potential fall event being a false positive if the total free fall interval satisfies the free fall interval threshold.

17. The method of claim 16, further comprising:
  determining maximum acceleration magnitude values from a plurality of fall event data sets in the fall event data set library; and
  identifying a minimum of the maximum acceleration magnitude values as the acceleration magnitude threshold.

18. The method of claim 17, further comprising:
  determining, for the plurality of fall event data sets in the fall event data set library, free fall intervals that precede respective maximum acceleration magnitude values;
  identifying, for the plurality of fall event data set in the fall event data set library, minimum acceleration magnitude values during the free fall intervals; and
  determining, from the plurality of fall event data sets in the fall event data set library, a maximum of the minimum acceleration magnitude values during the respective free fall intervals as the free fall magnitude threshold.

19. The method of claim 16, further comprising:
  determining a plurality of acceleration component values from the set of acceleration magnitude values,
    the plurality of acceleration component values corresponding to an acceleration component along one of a plurality of perpendicular axes of the set of acceleration magnitude values;
  determining, for the plurality of acceleration component values, a number of zero-axis crossing events; and
  determining that the acceleration data corresponds to a non-fall event occurred if the number of zero-axis crossing events is greater than one.

20. The method of claim 19, further comprising:
  integrating acceleration magnitude values, of the plurality of acceleration magnitude values, corresponding to each of the plurality of acceleration component values between two zero-axis crossing events;
  scaling, based on integrating the acceleration values, the acceleration component values between the two zero-axis crossing events to adjust the plurality of acceleration component values to values comparable to a fall event or to a non-fall event without spin;
  computing, based on scaling the acceleration component values, scaled acceleration magnitudes; and
  using the scaled acceleration magnitudes as the acceleration magnitude values.

* * * * *